US011792820B2

(12) United States Patent
Sasaki

(10) Patent No.: US 11,792,820 B2
(45) Date of Patent: *Oct. 17, 2023

(54) BASE STATION, TERMINAL APPARATUS, FIRST TERMINAL APPARATUS, METHOD, PROGRAM, RECORDING MEDIUM AND SYSTEM

(71) Applicant: NEC Corporation, Tokyo (JP)

(72) Inventor: Shizen Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/944,300

(22) Filed: Sep. 14, 2022

(65) Prior Publication Data

US 2023/0007639 A1  Jan. 5, 2023

Related U.S. Application Data

(63) Continuation of application No. 17/130,838, filed on Dec. 22, 2020, now Pat. No. 11,497,011, which is a
(Continued)

(30) Foreign Application Priority Data

Aug. 1, 2017 (JP) ................... 2017-149247

(51) Int. Cl.
*H04W 72/04* (2023.01)
*H04B 1/713* (2011.01)
(Continued)

(52) U.S. Cl.
CPC ............ *H04W 72/23* (2023.01); *H04B 1/713* (2013.01); *H04L 1/1819* (2013.01);
(Continued)

(58) Field of Classification Search
CPC ..... H04W 72/23; H04W 72/04; H04W 72/21; H04W 72/0453; H04W 76/27;
(Continued)

(56) References Cited

U.S. PATENT DOCUMENTS 9,723,592 B2   8/2017 Kim .................. H04L 1/1861
2012/0082263 A1  4/2012 Ebrahimi Tazeh Mahalleh et al.
(Continued)

FOREIGN PATENT DOCUMENTS

AU   2014200894 A1   3/2014
JP   2014504061 A    2/2014
(Continued)

OTHER PUBLICATIONS

Japanese Office Communication for JP Application No. 2021-156087 dated Jan. 11, 2022 with English Translation.
(Continued)

*Primary Examiner* — Candal Elpenord
(74) *Attorney, Agent, or Firm* — Sughrue Mion, PLLC

(57) ABSTRACT

In order for a first terminal apparatus to transmit a physical uplink control channel to a base station without retuning regardless of a bandwidth part used by the first terminal apparatus, a base station 100 according to the present disclosure includes a communication processing unit 141 configured to communicate with the first terminal apparatus (terminal apparatus 200A) within a bandwidth part of an uplink system band, the bandwidth part being used by the first terminal apparatus (terminal apparatus 200A), wherein the bandwidth part includes a physical uplink control channel region used by the first terminal apparatus (terminal apparatus 200A).

30 Claims, 15 Drawing Sheets

Related U.S. Application Data continuation of application No. 17/015,713, filed on Sep. 9, 2020, now Pat. No. 10,904,875, which is a continuation of application No. 16/324,004, filed as application No. PCT/JP2018/025345 on Jul. 4, 2018, now Pat. No. 10,834,719.

(51) Int. Cl.

| | | |
|---|---|---|
| *H04L 5/00* | (2006.01) | |
| *H04L 1/18* | (2023.01) | |
| *H04W 76/27* | (2018.01) | |
| *H04W 80/02* | (2009.01) | |
| *H04W 72/23* | (2023.01) | |
| *H04L 1/1812* | (2023.01) | |
| *H04W 72/21* | (2023.01) | |
| H04W 72/0453 | (2023.01) | |

(52) U.S. Cl.
CPC .......... *H04L 5/0055* (2013.01); *H04W 72/04* (2013.01); *H04W 72/21* (2023.01); *H04W 76/27* (2018.02); *H04W 80/02* (2013.01); H04W 72/0453 (2013.01)

(58) Field of Classification Search
CPC .... H04W 80/02; H04L 1/1819; H04L 1/1893; H04L 1/1896; H04L 5/0055; H04L 5/0026; H04L 5/0064; H04L 5/001; H04L 5/0012; H04L 5/0094; H04B 1/713
USPC ................................. 370/329–330
See application file for complete search history.

(56) References Cited

U.S. PATENT DOCUMENTS

| | | | |
|---|---|---|---|
| 2012/0390741 | | 11/2012 | Han et al. |
| 2013/0242890 | A1 | 9/2013 | He et al. |
| 2013/0242923 | A1 | 9/2013 | Yang et al. |
| 2014/0219202 | A1 | 8/2014 | Kim .................. H04W 72/042 370/329 |
| 2015/0215081 | A1 | 7/2015 | Chae et al. |
| 2015/0230210 | A1 | 8/2015 | Lee et al. |
| 2015/0271839 | A1 | 9/2015 | She et al. |
| 2015/0319746 | A1 | 11/2015 | Lu et al. |
| 2016/0254878 | A1 | 9/2016 | Wang et al. |
| 2017/0054531 | A1 | 2/2017 | Chae et al. |
| 2017/0055249 | A1 | 2/2017 | Yasukawa et al. |
| 2018/0255542 | A1 | 9/2018 | Seo et al. |
| 2018/0316464 | A1 | 11/2018 | Stern-Berkowitz et al. |
| 2018/0332566 | A1 | 11/2018 | You et al. |
| 2018/0376500 | A1* | 12/2018 | Yang ................ H04W 72/0446 |
| 2019/0007175 | A1 | 1/2019 | Kwak et al. |
| 2019/0254012 | A1 | 8/2019 | Seo et al. |
| 2019/0372721 | A1 | 12/2019 | Lee ....................... H04L 1/1812 |
| 2019/0380125 | A1 | 12/2019 | Yamamoto et al. |
| 2020/0146096 | A1 | 5/2020 | Park |
| 2020/0187236 | A1 | 6/2020 | Moon et al. |

FOREIGN PATENT DOCUMENTS

| | | |
|---|---|---|
| JP | 2015-164279 A | 9/2015 |
| JP | 2015534307 A | 11/2015 |
| JP | 2016-509385 A | 3/2016 |
| WO | 2014031829 A2 | 2/2014 |
| WO | 2016/025836 A1 | 2/2016 |
| WO | 2019026157 A1 | 2/2019 |

OTHER PUBLICATIONS

U.S. Natice on Allowance for U.S. Appl. No. 17/496,985 dated Dec. 8, 2021.
Huawei, HiSilicon, Handling collisions between n+4 and n+3<, 3GPP TSG RAN WG1 Meeting #88bis, R1-1704256, USA, Apr. 3-7, 2017.
Nokia, Alcatel-Lucent Shanghai Bell, "On wider band aspects of NR", 3GPP TSG-RAN WG1 Meeting NR#2, R1-1710883, China, Jun. 27-30, 2017.
InterDigital, Inc., "On frequency-domain resource allocation for NR," 3GPP TSG RAN WG1 NR Ad-Hoc#2, R1-1710953, P.R. China, Jun. 27-30, 2017.
RAN WG1, "LS an Bandwidth Part Operation in NR", 3GPP TSG RAN WG2#99, R2-1707624, Germany, Aug. 21-25, 2017.
Ericsson, "On bandwidth parts and "RF" requirements," 3GPP TSG RAN1 NR Ad-Hoc#2, R1-1711795.P.R. China Jun. 27-30, 2017.
Notice of Allowance dated Nov. 20, 2020, issued by the USPTO in U.S. Appl. No. 17/015,713.
CMCC, "Discussion on subband-based PUCCH resource allocation and indication", 3GPP TSG RAN WG1 Meeting NR Ad-Hoc#2, Qingdao, China, Jun. 27-30, 2017, R1-1710782 (8 pages).
Fujitsu, PUCCH resource allocation, R1-1710237, 3GPP TSG RAN WG1 NR Ad-Hoc#2, Qingdao, P.R. China, Jun. 27-30, 2017, pp. 1-3.
Office Action dated Aug. 15, 2019 issued in U.S. Appl. No. 16/507,888.
RAN WG1 "LS on UE RF Bandwidth Adaptation in NR", 3GPP TSG RAN WG1 Meeting #87, Reno, USA, Nov. 14-18, 2016, R1-1613663 (1 page).
Ericsson, et al., "WF on RRC Parameters Related to PUCCH for MTC", 3GPP TSG RAN WG1 Meeting #83, R1-157475, Nov. 15-22, 2015, (8 pages total).
Ericsson, "On PUCCH Resource Allocation," 3GPP TSG RAN WG1#88b, R1-1706940, Mar. 25, 2017, 5 pages.
Huawei, "PUCCH and UCI for MTC and coverage enhancemert", 3GPP TSG RAN WG1 #80b, R1-151267, Apr. 10, 2015, 6 pages.
Motorola Mobility, Lenovo, Further discussion on short duration uplink control channel, R1-1703946, 3GPP TSG RAN WG1 Meeting #88, Athens, Greece, Feb. 13-17, 2017, pp. 1-4.
Office Action dated Feb. 20, 2020 by the USPTO in U.S. Appl. No. 15/324,004.
RAN WG1 NR Ad-Hoc#2, "Bandwidth part configuration and frequency resource allocation", 3GPP TSG RAN WG1 NR Ad-Hoc#2, Qingdao, P.R. China Jun. 27-30, 2017, R1-1710164 (6 pages).
Written Opinion of the International Searching Authority dated Sep. 13, 2018 in International Application No. PCT/JP2016/025345.
3GPP TS 36.213 V14.3.0, Release 14, (Jun. 2017), pp. 306-390 ( 85 pages total).
Extended European Patent Office dated Jun. 17, 2020, from the European Patent Office in Application No. 18840369.5.
Japanese Application No. 2017-057802 filed Mar. 23, 2017.
Notice of Allowance dated Jul. 17, 2020 in U.S. Appl. No. 16/324,004.
Qualcomm Incorporated, Resource allocation for PUCCH, R1-1711194, TSG-RAN WG1 NR AH Meeting#2, Qingdao, China, Jun. 27-30, 2017, pp. 1-4.
RAN WG4, "Reply LS on UE RF Bandwidth Adaptation in NR". 3GPP TSG RAN WG1 Meeting #88bis, Spokane, USA, Apr. 3-7, 2017, R1-1704179 (R4-1702029) 2 pages.
U.S. Appl. No. 62/475,469, filed Mar. 23, 2017.
International Search Report, dated Sep. 18, 2018 from the International Bureau in counterpart International application No. PCT/JP2018/025345.
Motorola Mobility, Lenovo, PUCCH resource allocation for HARQ-ACK feedback to Msg4, R1-1711283, 3GPP TSG RAN WG1 NR Ad-Hoc#2, Qingdao, P. R. China, Jun. 27-30, 2017, pp. 1-4.
Panasonic, "Discussion on resource allocation for uplink control channel", 3GPP TSG RAN WG1 NR Ad-Hoc#2, R1-1710937, Jun. 27-30, 2017, ( 3 pages total).
RAN WG1, "Further views on wider bandwidth operations for NR", 3GPP TSG RAN WG1 Meeting #69, Hangzhou, P.R. China May 15-19, 2017, R1-1708494, (6 pages).
Samsung, "Resource Allocation for PUCCH with HARQ-ACK", 3GPP TSG RAN WG1 NR Ad-Hoc#2, R1-1710709, vol. 1, Qindao, P.R. China, Jun. 27-30, 2017, XP051299915, 4 pages total.
3GPP TS 36.211 8 V14.3.0, Release 14, (Jun. 2017), pp. 8-75 (68 Pages total).
U.S. Office Action for U.S. Appl. No. 17/130,838 dated Mar. 14, 2022.

(56) References Cited

OTHER PUBLICATIONS

U.S. Notice of Allowance for U.S. Appl. No. 17/130,838 dated Jul. 6, 2022.
Chinese Office Action for CN Application No. 201880049131.5 dated Dec. 22, 2022 with English Translation.
Intel Corporation, "Structure of 1~2 bits HARQ-ACK long PUCCH with TDM DMRS", 3GPP tsg ran WG1, R1-1710553, P.R.China, Jun. 27-30, 2017.
Motorola, "Repetition of UL ACK/NACK on PUCCH", 3GPP tsg ran1, R1-081291, China, Mar. 31-Apr. 4, 2008.
JP Office Action for JP Application No. 2022-015626, dated Dec. 6, 2022 with English Translation.
Intel Corporation, "Resource allocation for PUCCH during initial access", 3GPP TSG RAN WG1 adhoc_NR_AH_1706, R1-1710557, Jun. 30, 2017.

\* cited by examiner

BASE STATION, TERMINAL APPARATUS, FIRST TERMINAL APPARATUS, METHOD, PROGRAM, RECORDING MEDIUM AND SYSTEM

CROSS-REFERENCE TO RELATED APPLICATIONS

The present application is a continuation application of U.S. patent application Ser. No. 17/130,838 filed on Dec. 22, 2020, which is a continuation application of U.S. patent application Ser. No. 17/015,713 filed on Sep. 9, 2020, which issued as U.S. Pat. No. 10,904,875, which is a continuation application of U.S. patent application Ser. No. 16/324,004 filed on Feb. 7, 2019, which issued as U.S. Pat. No. 10,834,719, which is a National Stage Entry of international application PCT/JP2018/025345 filed on Jul. 4, 2018, which claims the benefit of priority from Japanese Patent Application No. 2017-149247 filed on Aug. 1, 2017, the disclosures of all of which are incorporated in their entirety by reference herein.

BACKGROUND

Technical Field

The present disclosure relates to a base station, a terminal apparatus, a first terminal apparatus, a method, a program, a recording medium and a system.

Background Art

In 3rd Generation Partnership Project (3GPP), development of specifications of New Radio (NR) which is a fifth generation mobile communication system is ongoing. NR is much different from Long Term Evolution (LTE), which is an existing mobile communication system, and, in NR, transmission and reception bandwidths of respective terminal apparatuses may be different (for example, see NPL 1, 2 and 3).

Furthermore, in a general mobile communication system, a terminal apparatus transmits, in uplink, hybrid automatic repeat request acknowledgement (HARQ-ACK) information indicating whether data received in downlink is correctly decoded or not. In NR, a physical uplink control channel (PUCCH) or a physical uplink shared channel (PUSCH) is used as a physical channel for transmitting uplink control information (UCI) including this HARQ-ACK information.

For example, PLT 1 discloses that a base station determines a PUCCH resource dynamically from among candidates which a terminal apparatus is notified of in advance and notifies the terminal apparatus of the PUCCH resource.

A PUCCH used in NR is expected to have structure similar to PUCCH format 1/1a/1b used in LTE. One of specific common points is support for frequency hopping in a slot. When frequency hopping is performed in transmission of such a PUCCH, it may be necessary to perform retuning of a transmission band within an uplink system band because maximum transmission bandwidths of respective terminal apparatuses may be different in NR for example as described in NPL 1. Specifically, a terminal apparatus whose maximum transmission bandwidth is smaller than an uplink system bandwidth may need to perform frequency hopping using both edges of an uplink system band by performing above described retuning.

Here, a time period between 50 microseconds and 200 microseconds is needed for retuning with change of a center frequency, for example as described in NPL 4.

CITATION LIST

Patent Literature

[PTL 1] JP 2014-504061 T

Non Patent Literature

[NPL 1] RAN WG1 "LS on UE RF Bandwidth Adaptation in NR", 3GPP TSG RAN WG1 Meeting #87. Reno, USA, 14-18 Nov. 2016. R1-1613663

[NPL 2] RAN WG1 NR Ad-Hoc #2 "Bandwidth part configuration and frequency resource allocation", 3GPP TSG RAN WG1 NR Ad-Hoc #2. Qingdao, P.R. China 27-30 Jun. 2017. R1-1710164

[NPL 3] RAN WG1 "Further views on wider bandwidth operations for NR", 3GPP TSG RAN WG1 Meeting #89. Hangzhou, P.R. China 15-19 May 2017. R1-1708494

[NPL 4] RAN WG4 "Reply LS on UE RF Bandwidth Adaptation in NR", 3GPP TSG RAN WG1 Meeting #88bis. Spokane, USA, 3-7 Apr. 2017. R1-1704179 (R4-1702029)

SUMMARY

Technical Problem

However, in order to perform retuning, insertion of a guard period is needed, for example. As a result, communication resource usable for transmission of a PUCCH is decreased, which may cause reduction of coverage.

An example object of the present disclosure is to provide a base station, a terminal apparatus, a first terminal apparatus, a method, a program, a recording medium and system enables a first terminal apparatus to transmit a physical uplink control channel to a base station without retuning regardless of a bandwidth part used by the first terminal apparatus.

Solution to Problem

According to one example aspect of the present disclosure, a base station includes a communication processing unit configured to communicate with a first terminal apparatus in an active uplink bandwidth part of an uplink system band, the active uplink bandwidth part being used by the first terminal apparatus, wherein the base station is configured to transmit, to the first terminal apparatus, first control information identifying a relative resource of a physical uplink control channel within the active uplink bandwidth part, the relative resource being a resource for the first terminal apparatus to use for transmission of the physical uplink control channel.

According to one example aspect of the present disclosure, a terminal apparatus includes a communication processing unit configured to communicate with a base station in an active uplink bandwidth part of an uplink system band, wherein the terminal apparatus is configured to receive, from the base station, first control information identifying a relative resource of a physical uplink control channel within the active uplink bandwidth part, the relative resource being a resource to use for transmission of the physical uplink control channel.

According to one example aspect of the present disclosure, a base station includes a communication processing unit configured to communicate with a first terminal apparatus in a bandwidth part of an uplink system band, the bandwidth part being used by the first terminal apparatus, wherein the bandwidth part includes a physical uplink control channel region used by the first terminal apparatus.

According to one example aspect of the present disclosure, a first terminal apparatus includes a communication processing unit configured to communicate with a base station in a bandwidth part of an uplink system band, the bandwidth part being used by the first terminal apparatus, wherein the bandwidth part includes a physical uplink control channel region used by the first terminal apparatus.

According to one example aspect of the present disclosure, a first method includes communicating with a first terminal apparatus in a bandwidth part of an uplink system band, the bandwidth part being used by the first terminal apparatus, wherein the bandwidth part includes a physical uplink control channel region used by the first terminal apparatus.

According to one example aspect of the present disclosure, a second method includes communicating with a base station in a bandwidth part of an uplink system band, the bandwidth part being used by the first terminal apparatus, wherein the bandwidth part includes a physical uplink control channel region used by the first terminal apparatus.

According to one example aspect of the present disclosure, a first program is a program that causes a processor to execute communicating with a first terminal apparatus in a bandwidth part of an uplink system band, the bandwidth part being used by the first terminal apparatus, wherein the bandwidth part includes a physical uplink control channel region used by the first terminal apparatus.

According to one example aspect of the present disclosure, a second program is a program that causes a processor to execute communicating with a base station in a bandwidth part of an uplink system band, the bandwidth part being used by the first terminal apparatus, wherein the bandwidth part includes a physical uplink control channel region used by the first terminal apparatus.

According to one example aspect of the present disclosure, a first recording medium is a non-transitory computer readable recording medium having recorded thereon a program that causes a processor to execute communicating with a first terminal apparatus in a bandwidth part of an uplink system band, the bandwidth part being used by the first terminal apparatus, wherein the bandwidth part includes a physical uplink control channel region used by the first terminal apparatus.

According to one example aspect of the present disclosure, a second recording medium is a non-transitory computer readable recording medium having recorded thereon a program that causes a processor to execute communicating with a base station in a bandwidth part of an uplink system band, the bandwidth part being used by the first terminal apparatus, wherein the bandwidth part includes a physical uplink control channel region used by the first terminal apparatus.

According to one example aspect of the present disclosure, a system includes a base station including a communication processing unit configured to communicate with a first terminal apparatus in a bandwidth part of an uplink system band, the bandwidth part being used by the first terminal apparatus, and the first terminal apparatus including a communication processing unit configured to communicate with the base station in the bandwidth part, wherein the bandwidth part includes a physical uplink control channel region used by the first terminal apparatus.

Advantageous Effects of Disclosure

According to an example aspect of the present disclosure, it is possible for a first terminal apparatus to transmit a physical uplink control channel to a base station without retuning regardless of a bandwidth part used by the first terminal apparatus. Note that the present disclosure may exert other advantageous effects instead of the above advantageous effects or together with the above advantageous effects.

DESCRIPTION OF THE EXAMPLE EMBODIMENTS

Example embodiments of the present disclosure will be described below in detail with reference to the accompanying drawings. Note that, in the present description and drawings, elements to which the same or similar descriptions are applicable are denoted by the same reference signs, whereby overlapping descriptions may be omitted.

Description will be given in the following order.
1. Related Arts
2. Overview of Example Embodiments of the Present Disclosure
3. Configuration of System
4. First Example Embodiment
4.1. Configuration of Base Station
4.2. Configuration of Terminal Apparatus
4.3. Technical Features
4.4. Specific Examples
5. Second Example Embodiment
5.1. Configuration of Base Station
5.2. Configuration of Terminal Apparatus
5.3. Technical Features
6. Other Example Aspects 1. Related Arts As arts related to example embodiments of the present disclosure, a physical uplink control channel (PUCCH) used in NR is described mainly.

In NR, there are two types of PUCCHs with different time duration, that is a PUCCH with a short time duration (hereinafter referred to as "Short PUCCH") and a PUCCH with a long time duration (hereinafter referred to as "Long PUCCH").

A Long PUCCH of them includes 4 to 14 orthogonal frequency division multiplexing (OFDM) symbols. A Long PUCCH is intended to be used mainly for coverage improvement.

Furthermore, when the number of bits of UCI transmitted on a Long PUCCH is equal to or less than 2, a Long PUCCH is expected to have a structure similar to PUCCH format 1/1a/1b of LTE in light of agreement up to this point.

Specific common points are support for frequency hopping in a slot, and binary phase shift keying (BPSK) or quadrature phase shift keying (QPSK) to be used as a modulation scheme for HARQ-ACK information, multiplication of modulated symbols repeated in a time domain by a sequence, and applicability of orthogonal cover code(s) of a time domain to UCI and reference signal(s) (RS(s)).

Note that a slot is one of scheduling units in NR. In case of Normal cyclic prefix (CP), one slot includes 7 or 14 OFDM symbols.

One resource block (RB) includes 12 subcarriers contiguous in a frequency domain. Note that "RB" is used as "a minimum unit of resource allocation in frequency domain" in present example embodiments because a time period of an RB in NR has not been defined yet. In addition, "RB" as referred to herein may be referred to as "physical resource block (PRB)".

Figure 1:
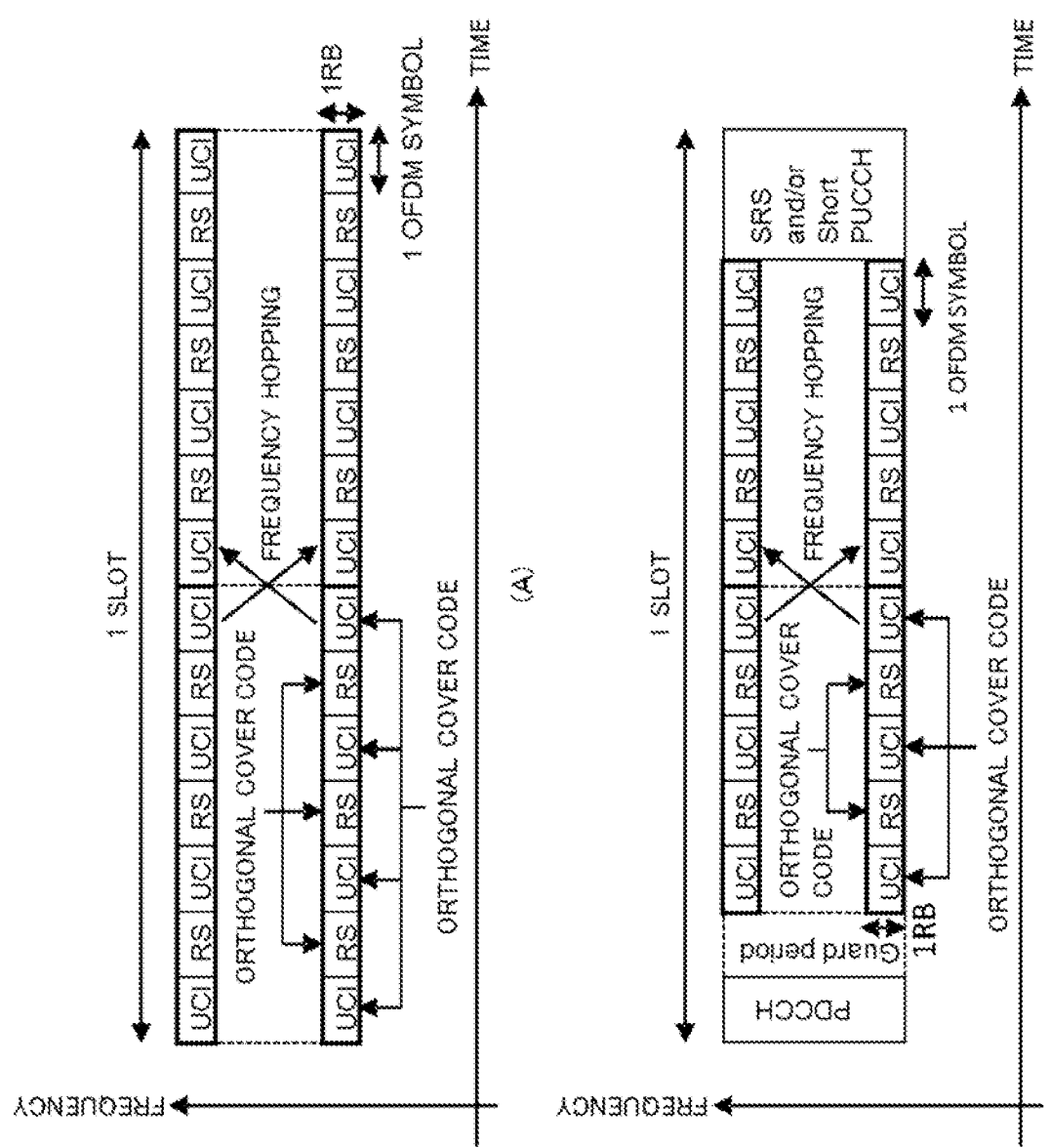
FIG. 1 is a diagram illustrating an example configuration of Long PUCCH for the case of one slot including 14 OFDM symbols.

FIG. 1 is a diagram illustrating example configuration of Long PUCCH for the case of one slot including 14 OFDM symbols. Specifically, in example configuration illustrated in FIG. 1(A), 14 OFDM symbols are used for transmission of a Long PUCCH. A Long PUCCH with such configuration is realized when all OFDM symbols in a slot can be used for uplink transmission.

Figure 10:
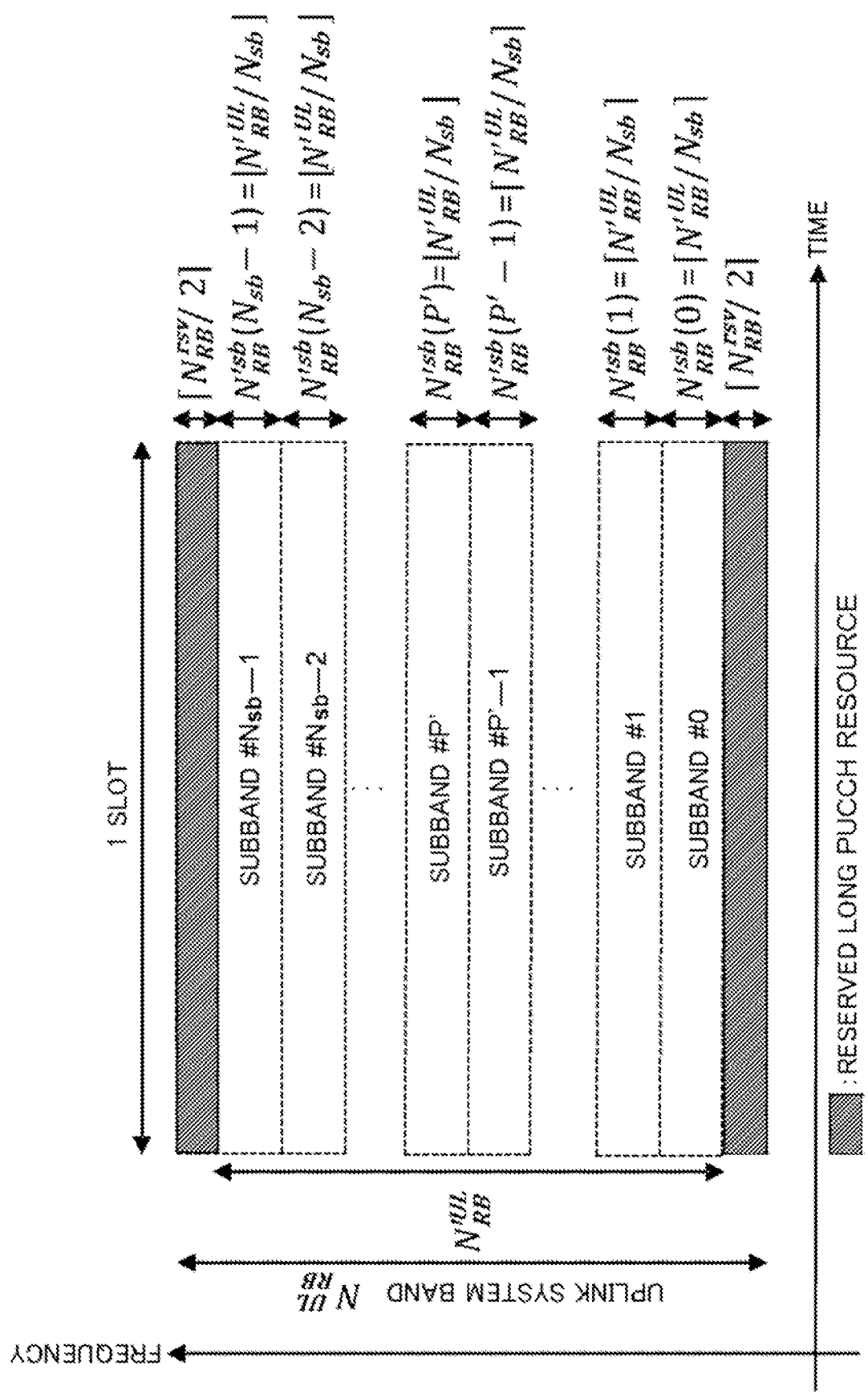
FIG. 10 is a diagram illustrating subbands according to a second specific example.

On the other hand, in example configuration illustrated in FIG. 1(B), 10 OFDM symbols are used for transmission of a Long PUCCH. This is an example in which slot configuration in time division duplex (TDD) is used. Specifically, after a physical downlink control channels (PDCCHs) are transmitted at the beginning of a slot, a guard period necessary for switching from downlink to uplink is inserted. Subsequently, a Short PUCCH and/or a sounding reference signal (SRS) are transmitted at the end of the slot. A total of 4 OFDM symbols are used for such transmission, and the remaining 10 OFDM symbols are used for transmission of a Long PUCCH.

Figure 2:
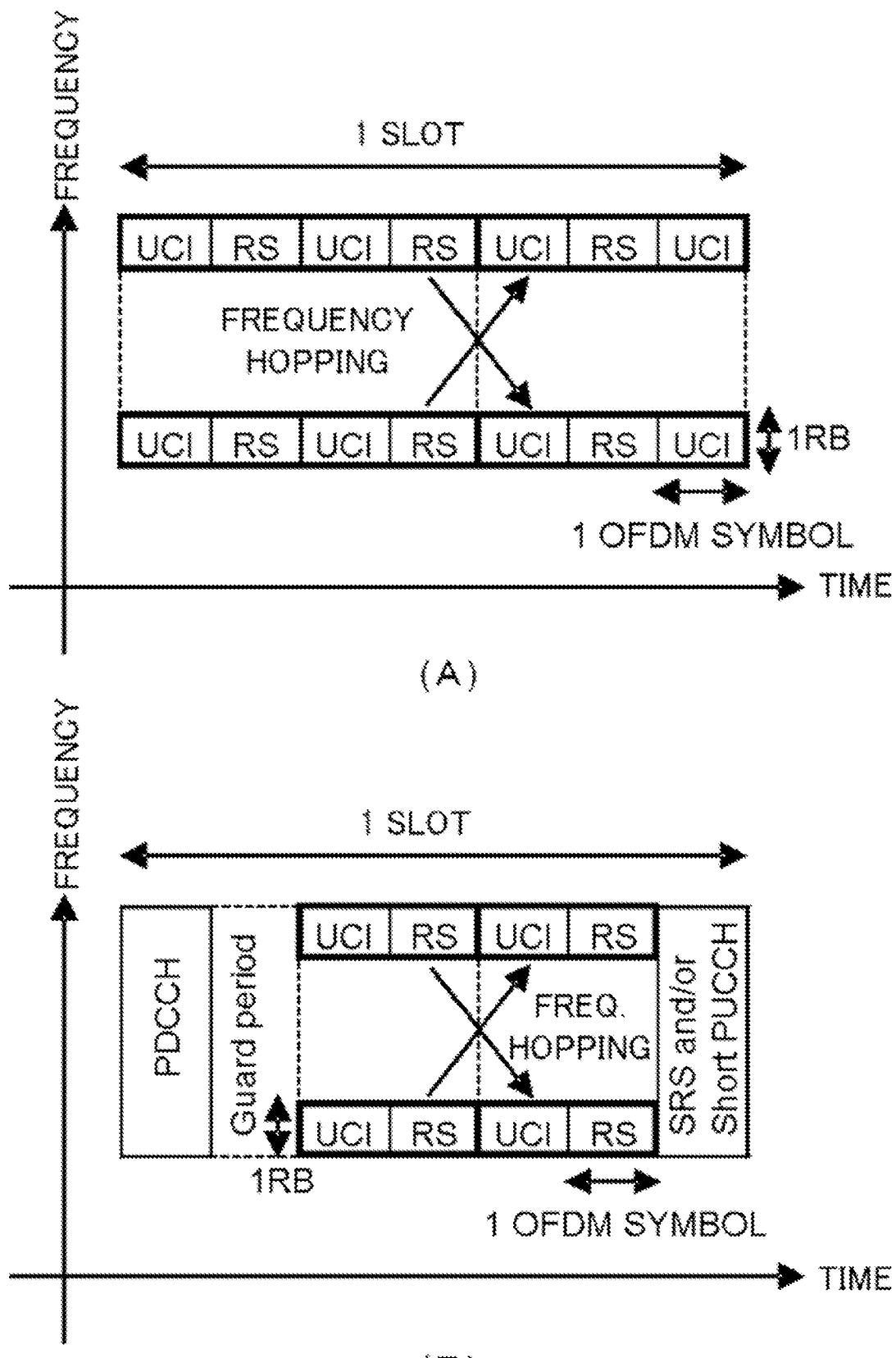
FIG. 2 is a diagram illustrating an example configuration of Long PUCCH for the case of one slot including 7 OFDM symbols.

FIG. 2 is a diagram illustrating an example configuration of Long PUCCH for the case of one slot including 7 OFDM symbols. In the example configuration illustrated in FIG. 2(A), 7 OFDM symbols are used for transmission of a Long PUCCH. In the example configuration illustrated in FIG. 2(B), 4 OFDM symbols are used for transmission of a Long PUCCH.

It is possible to multiplex UCI for a plurality of terminal apparatuses in one RB included in a Long PUCCH. This multiplexing is realized with different combinations of a cyclic shift and an orthogonal cover code used by respective terminals. In the present example embodiments, a multiplexing method for PUCCH format 1/1a/1b of LTE is assumed for description.

First, multiplexing by cyclic shifting is realized by using a Constant Amplitude Zero Auto-Correlation (CAZAC) sequence for transmission of UCI and RSs. A CAZAC sequence has a property of an autocorrelation value being zero in case that a cyclic shift value is not zero. Cyclic shifting represents shift processing which shifts an element at the end of a sequence to the beginning in order. One example of a CAZAC sequence is a Zadoff-Chu sequence. Furthermore, in LTE, computer generated sequences (CGS) are used as CAZAC sequences for the case that a sequence length is 12 or 24.

In case that a one-twelfth of a time period of one OFDM symbol excluding a CP part is expressed by $\Delta T$, it is possible to multiplex a maximum of twelve UCI and RSs by performing cyclic shifting of $u \times \Delta T$ (u is an integer between 0 and 11). Here, in order to maintain orthogonality between terminals, it is necessary that a minimum gap between cyclic shifts is larger than a maximum delay path of a propagation channel. In LTE, a minimum gap between cyclic shifts $\Delta_{shift} \times \Delta T$ is adjusted by using a parameter common within a cell $\Delta_{shift}$ ($\Delta_{shift}$=1, 2, 3). Therefore, the maximum number of multiplexing by cyclic shifting is $12/\Delta_{shift}$.

Multiplexing by orthogonal cover codes is realized by performing block-spreading of UCI and RSs over a plurality of OFDM symbols. Using orthogonal cover codes enables multiplexing of the same number of complex symbols as its sequence length by block-spreading. Here, orthogonal cover codes are applied independently to respective UCI and RSs before and after frequency hopping, and its sequence length is equal to the number of OFDM symbols allocated to each. As a result, a maximum multiplexing number is a minimum value of the number of OFDM symbols allocated to respective UCI and RSs before and after frequency hopping.

The maximum number of multiplexing by orthogonal cover codes is 3 in case of the example configuration illustrated in FIG. 1(A) and is 2 in case of the example configuration illustrated in FIG. 1(B). On the other hand, in the example configurations illustrated respectively in FIG. 2(A) and FIG. 2(B), multiplexing by orthogonal cover codes is not performed because an RS includes a single OFDM symbol after frequency hopping.

The number of multiplexed UCI per one RB of Long PUCCH, denoted as N, is expressed by a product of a maximum multiplexing number by cyclic shifting and a maximum multiplexing number by orthogonal cover codes. For example, when a maximum multiplexing number by cyclic shifting is 4 (i.e. $\Delta_{shift}=3$) and a maximum multiplexing number by orthogonal cover codes is 3, 4×3=12 pieces of UCI can be multiplexed per one RB.

Figure 3:
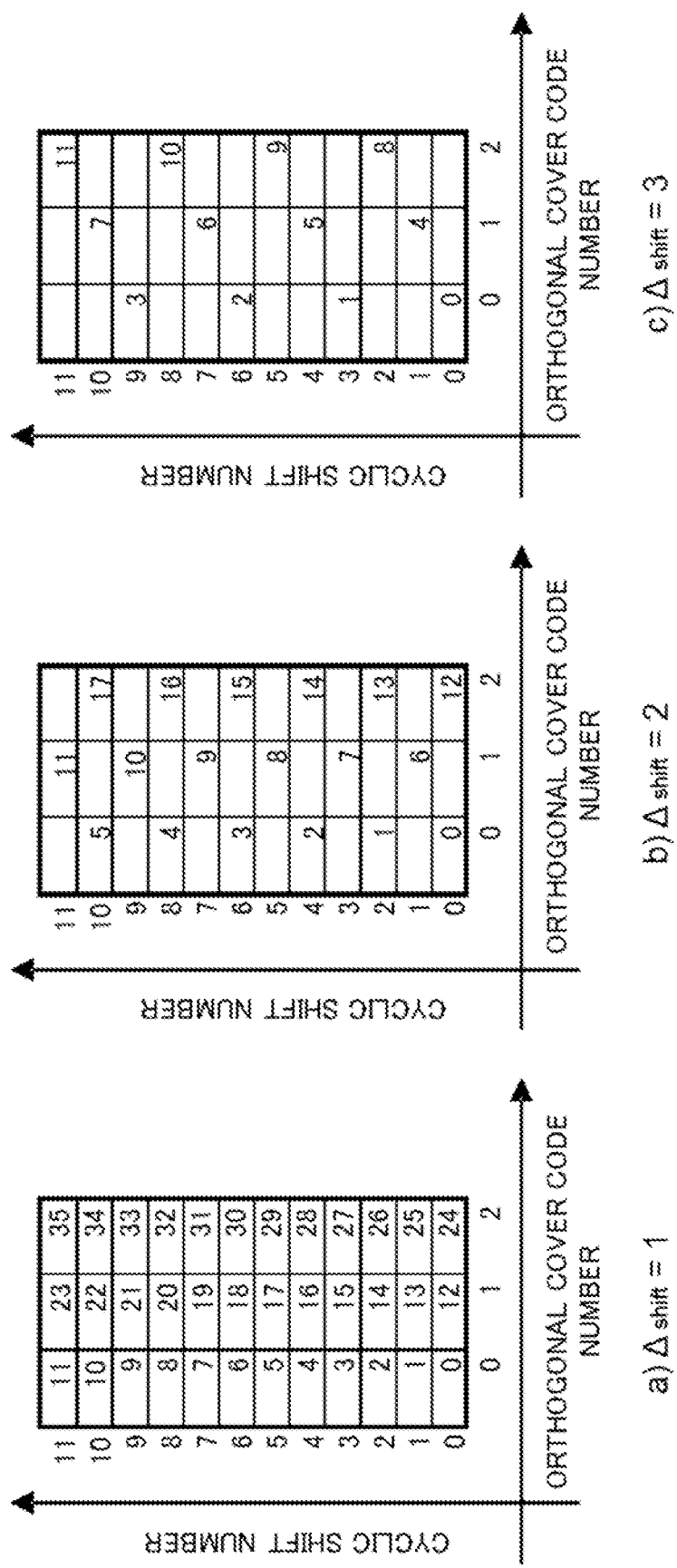
FIG. 3 is a diagram illustrating examples of combinations of A shift, cyclic shift number u, and orthogonal cover code number c.

FIG. 3 is a diagram illustrating examples of combinations of A shift, cyclic shift number u, and orthogonal cover code number c. It is possible to perform numbering of resources which can be multiplexed per one RB of Long PUCCH by selecting one of the combinations as illustrated in FIG. 3. Note that FIG. 3 is one example, and for example different numbering per cell is possible.

Figure 4:
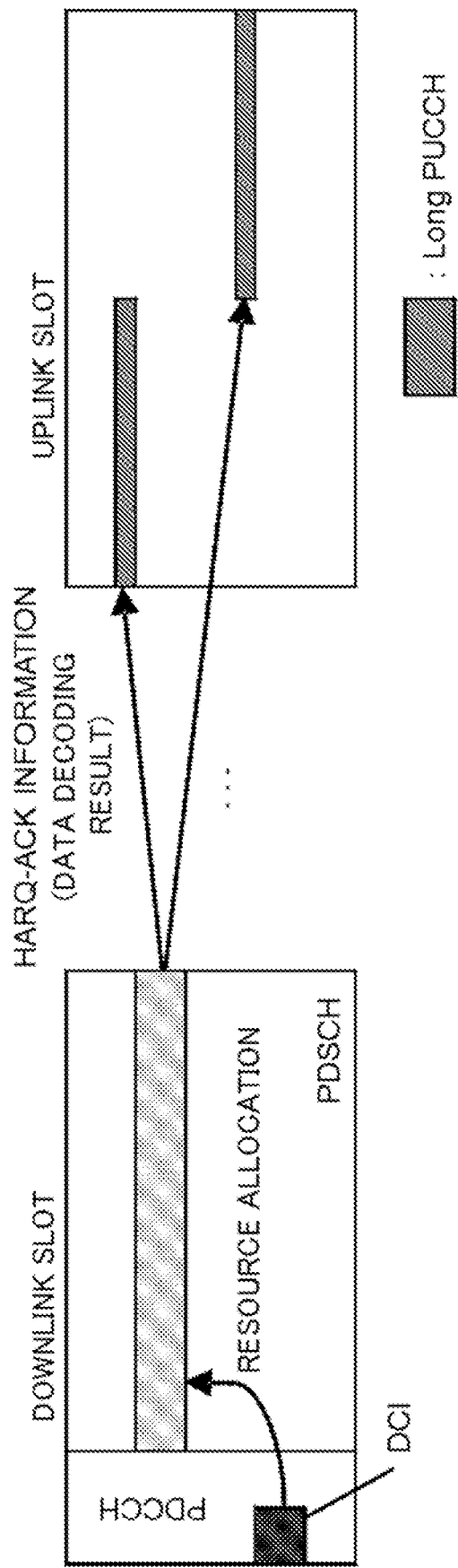
FIG. 4 is a schematic diagram for the case of one terminal apparatus transmitting HARQ-ACK information on a Long PUCCH.

FIG. 4 is a schematic diagram for the case of one terminal apparatus transmitting HARQ-ACK information on a Long PUCCH. A base station transmits data for a terminal apparatus on a physical downlink shared channel (PDSCH), and transmits downlink control information (DCI) including allocation information for the data on a physical downlink control channel (PDCCH). On the other hand, the terminal apparatus receives the data on the PDSCH based on the DCI after receiving the DCI for the terminal apparatus on the PDCCH. Then, the terminal apparatus transmits, on a Long PUCCH in an uplink slot, HARQ-ACK information indicating whether the data is correctly decoded or not.

In NR, for a terminal apparatus, bandwidth part(s) including contiguous RBs is set for uplink and downlink respectively. Note that the number of RBs set for a bandwidth part is equal to or less than a maximum bandwidth supported by respective terminal apparatuses. One or more bandwidth parts are set for respective terminals. A terminal apparatus receives downlink signals within an active downlink bandwidth part of the set bandwidth part(s), and transmits uplink signals using an active uplink bandwidth part of the set bandwidth part(s).

2. Overview of Example Embodiments of the Present Disclosure

First, an overview of example embodiments of the present disclosure is described.

(1) Technical Problem

As maximum transmission bandwidths of respective terminal apparatuses may be different in NR as described above, a hopping gap in frequency domain may differ from terminal apparatus to terminal apparatus when frequency hopping is performed in transmission of a Long PUCCH. For example, a terminal apparatus whose maximum transmission bandwidth is smaller than an uplink system bandwidth may perform frequency hopping to a region other than edges of an uplink system band for transmission of a Long PUCCH.

Figure 5:
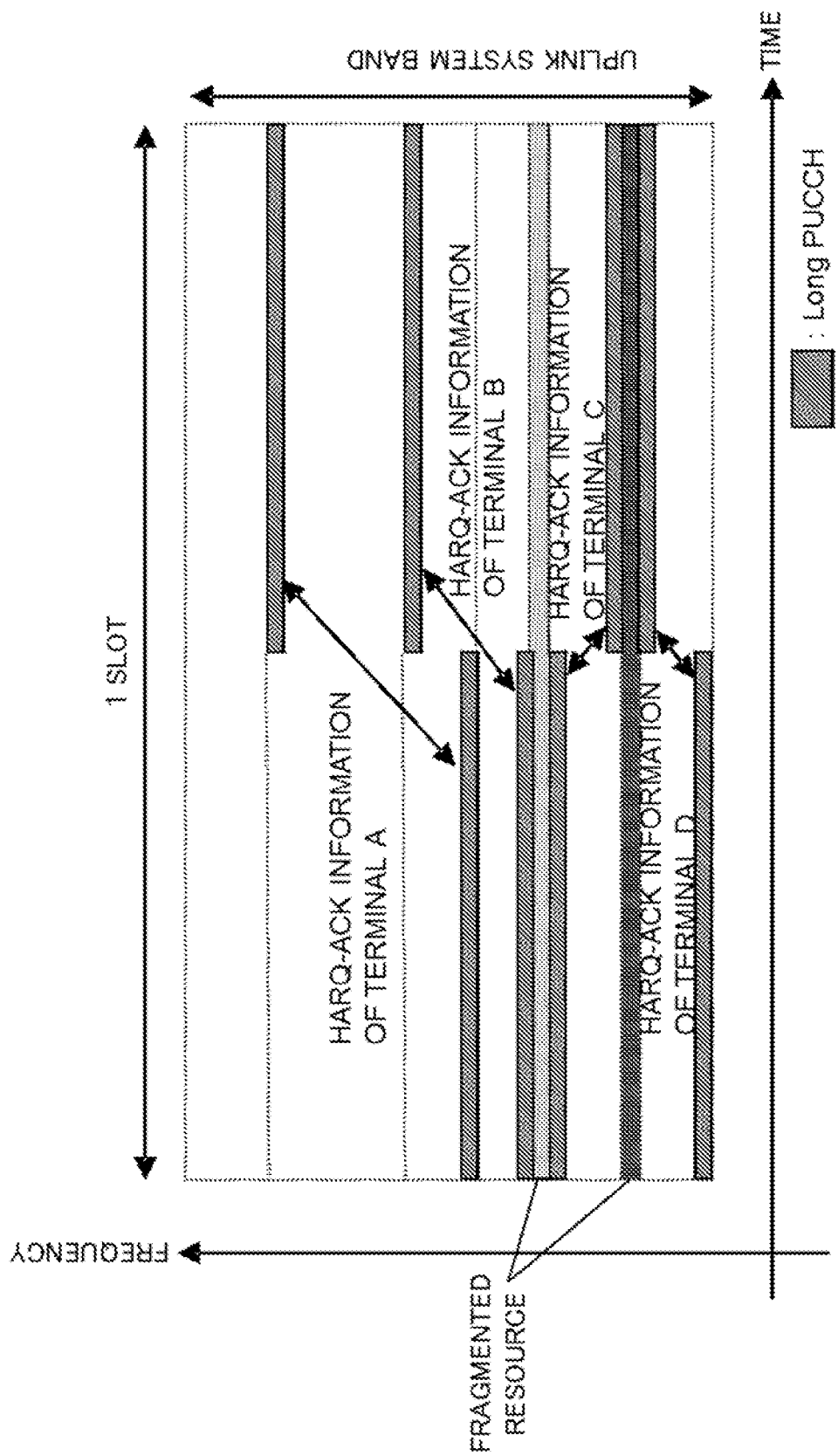
FIG. 5 is a diagram illustrating a specific example of resource positions with which frequency hopping is performed respectively by terminal apparatuses A-D whose maximum transmission bandwidths are smaller than an uplink system bandwidth.

FIG. 5 is a diagram illustrating a specific example of resource positions with which frequency hopping is performed respectively by terminal apparatuses A-D whose maximum transmission bandwidths are smaller than an uplink system bandwidth. As described in FIG. 5, fragmented resources may exist. Existence of such fragmented resources may cause flexibility of PUSCH resource allocation to be decreased.

In addition, it is agreed in NR to use both of Cyclic Prefix-Orthogonal Frequency Division Multiplexing (CP-OFDM) and Discrete Fourier Transform-spread-Orthogonal Frequency Division Multiplexing (DFT-s-OFDM) as an uplink transmission waveform. Furthermore, only contiguous RB allocation is assumed to be supported when DFT-s-OFDM is used as a transmission waveform of PUSCH.

Here, in case of DFT-s-OFDM, the number of contiguous RBs which can be allocated to one terminal apparatus is limited in light of existence of fragmented RBs illustrated in the above described FIG. 5. In addition, in case of CP-OFDM, although allocation of non-contiguous RBs is possible, resource allocation which utilizes all fragmented RBs is difficult in light of overhead of resource allocation information. Therefore, there may be a possibility that the number of unused RBs increases and use efficiency of radio resources is decreased.

As a method to prevent occurrence of the above described fragmented resources, it is proposed, for example as disclosed in the following reference document, that a PUCCH is transmitted on a resource which exists at the edge of a subband by setting a plurality of subbands in an uplink system band.

[reference document] CMCC "Discussion on subband-based PUCCH resource allocation and indication", 3GPP TSG RAN WG1 Meeting NR Ad-Hoc #2. Qingdao, China, 27-30 Jun. 2017. R1-1710782

However, in the above reference document, there is no disclosure of setting a limitation on the number of RBs and a start position in frequency domain for a subband. Therefore, overhead for notifying a terminal apparatus of information on a subband will be high if a subband with any number of RBs can be located at any position in frequency domain.

Here, a terminal apparatus whose maximum transmission bandwidth is smaller than an uplink system bandwidth can perform frequency hopping using both edges of an uplink system band by performing retuning which switches transmission bands within an uplink system band. However, a time period between 50 microseconds and 200 microseconds for example would be necessary for retuning which is accompanied by a change of a center frequency. In order to perform such retuning, for example, insertion of a guard period would be necessary, and the number of OFDM symbols available for transmission of a Long PUCCH would decrease, which may cause a reduction of coverage.

(2) Technical Features

According to example embodiments of the present disclosure, for example, a base station includes a communication processing unit configured to communicate with a first terminal apparatus in a bandwidth part of an uplink system band, the bandwidth part being used by the first terminal apparatus, wherein the bandwidth part includes a physical uplink control channel region used by the first terminal apparatus.

Furthermore, according to example embodiments of the present disclosure, for example, a first terminal apparatus includes a communication processing unit configured to communicate with a base station in a bandwidth part of an uplink system band, the bandwidth part being used by the first terminal apparatus, wherein the bandwidth part includes a physical uplink control channel region used by the first terminal apparatus.

According to the example embodiments, for example, it is possible for a first terminal apparatus to transmit a physical uplink control channel to a base station without retuning regardless of a bandwidth part used by the first terminal apparatus. More specifically, it is possible for a first terminal apparatus to transmit a physical uplink control channel to a base station without retuning even if the bandwidth part of the first terminal apparatus is smaller than an uplink system band.

Note that, the above described technical feature is one specific example of example embodiments of the present disclosure, and of course the example embodiments of the present disclosure are not limited to the above described technical features.

3. Configuration of System

Figure 6:
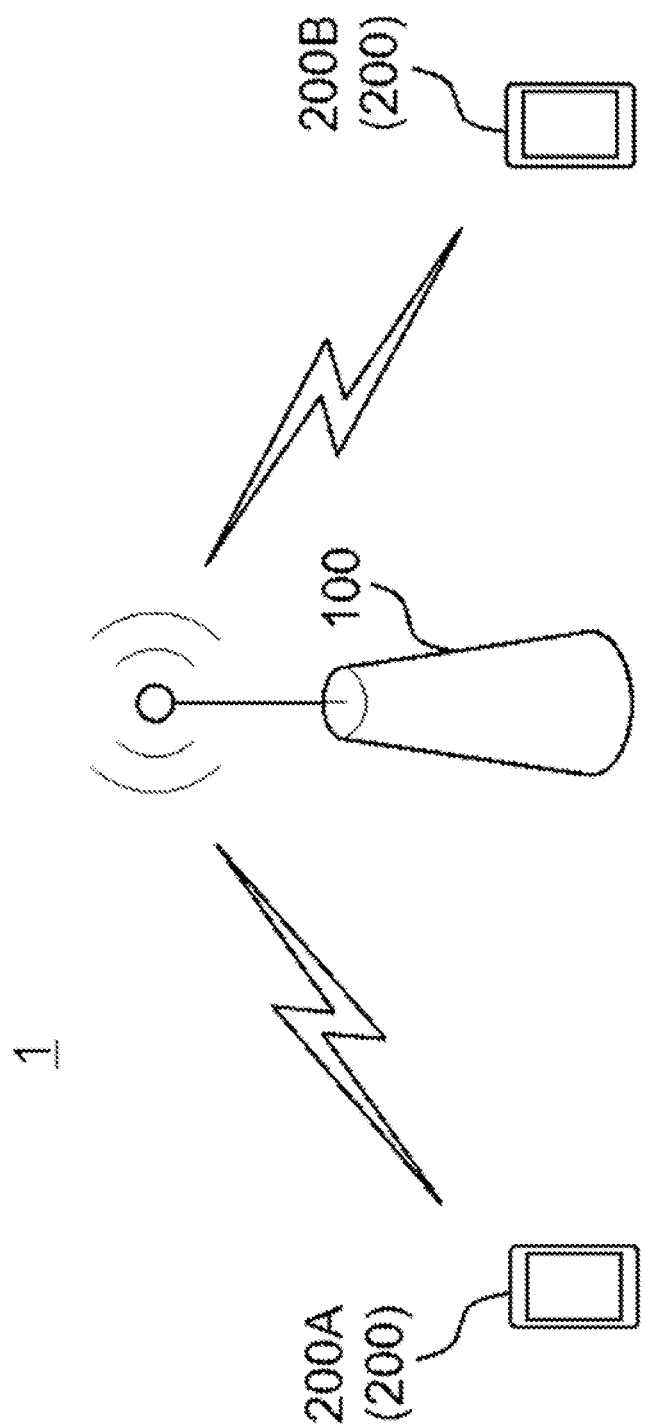
FIG. 6 is an explanatory diagram illustrating an example of a schematic configuration of system 1 according to example embodiments of the present disclosure.

With reference to FIG. 6, an example of a schematic configuration of a system 1 according to the example embodiments of the present disclosure is described. FIG. 6 is an explanatory diagram illustrating an example of a schematic configuration of the system 1 according to the example embodiments of the present disclosure. According to FIG. 6, the system 1 includes a base station 100, a terminal apparatus 200A and terminal apparatus 200B. Each of terminal apparatus 200A and terminal apparatus 200B is generally referred to as a terminal apparatus 200 below.

For example, the system 1 is a system conforming to Third Generation Partnership Project (3GPP) standards. More specifically, for example, the system 1 may be a system conforming to standards/specifications of LTE/LTE-Advanced/LTE-Advanced Pro and/or System Architecture Evolution (SAE). Alternatively, the system 1 may be a system conforming to standards/specifications of 5G/New Radio (NR). It is understandable that the system 1 is not limited to these examples.

(1) Base Station 100

The base station 100 is a node of a radio access network (RAN) and performs wireless communication with terminal apparatuses located in a coverage area (e.g. terminal apparatus 200A and terminal apparatus 200B).

For example, the base station 100 may be an evolved Node B (eNB), a generation Node B (gNB) in 5G, or a transmission reception point (TRP). The base station 100 may include a plurality of units (or a plurality of nodes). The plurality of units (or plurality of nodes) may include a first unit (or a first node) performing processing of a higher protocol layer, and a second unit (or a second node) performing processing of a lower protocol layer. As an example, the first unit may be referred to as a center/central unit (CU), and the second unit may be referred to as a distributed unit (DU) or an access unit (AU). As another example, the first unit may be referred to as a digital unit (DU), and the second unit may be referred to as a radio unit (RU) or a remote unit (RU). The digital unit (DU) may be a base band unit (BBU), and the RU may be a remote radio head (RRH) or a remote radio unit (RRU). Terms used to refer to the first unit (or first node) and the second unit (or second node) are, of course, not limited to these examples. Alternatively, the base station 100 may be a single unit (or single node). In this case, the base station 100 may be one of the multiple units (e.g., one of the first unit and the second unit) and may be connected to another one of the multiple units (e.g., the other one of the first unit and the second unit).

(2) Terminal Apparatus 200

The terminal apparatus 200 performs wireless communication with a base station. For example, when the terminal apparatus 200 is located in a coverage area of the base station 100, the terminal apparatus 200 performs wireless communication with the base station 100. For example, the terminal apparatus 200 is a user equipment (UE). The terminal apparatus 200 may be referred to as "a wireless communication apparatus", "a wireless communication terminal", "a user equipment", "a user terminal" or "a mobile station", etc., instead of "a terminal apparatus".

In the present example embodiments, for example, the terminal apparatus 200A has a different maximum reception bandwidth and a different maximum transmission bandwidth from the terminal apparatus 200B. More specifically, the terminal apparatus 200A has a smaller maximum reception bandwidth and a smaller maximum transmission bandwidth than the terminal apparatus 200B. As described, in the system 1, terminal apparatuses with different maximum reception bandwidths/maximum transmission bandwidths coexist.

4. First Example Embodiment

The first example embodiment of the present disclosure is described with reference to FIG. 7 to FIG. 14.

4.1. Configuration of Base Station

Figure 7:
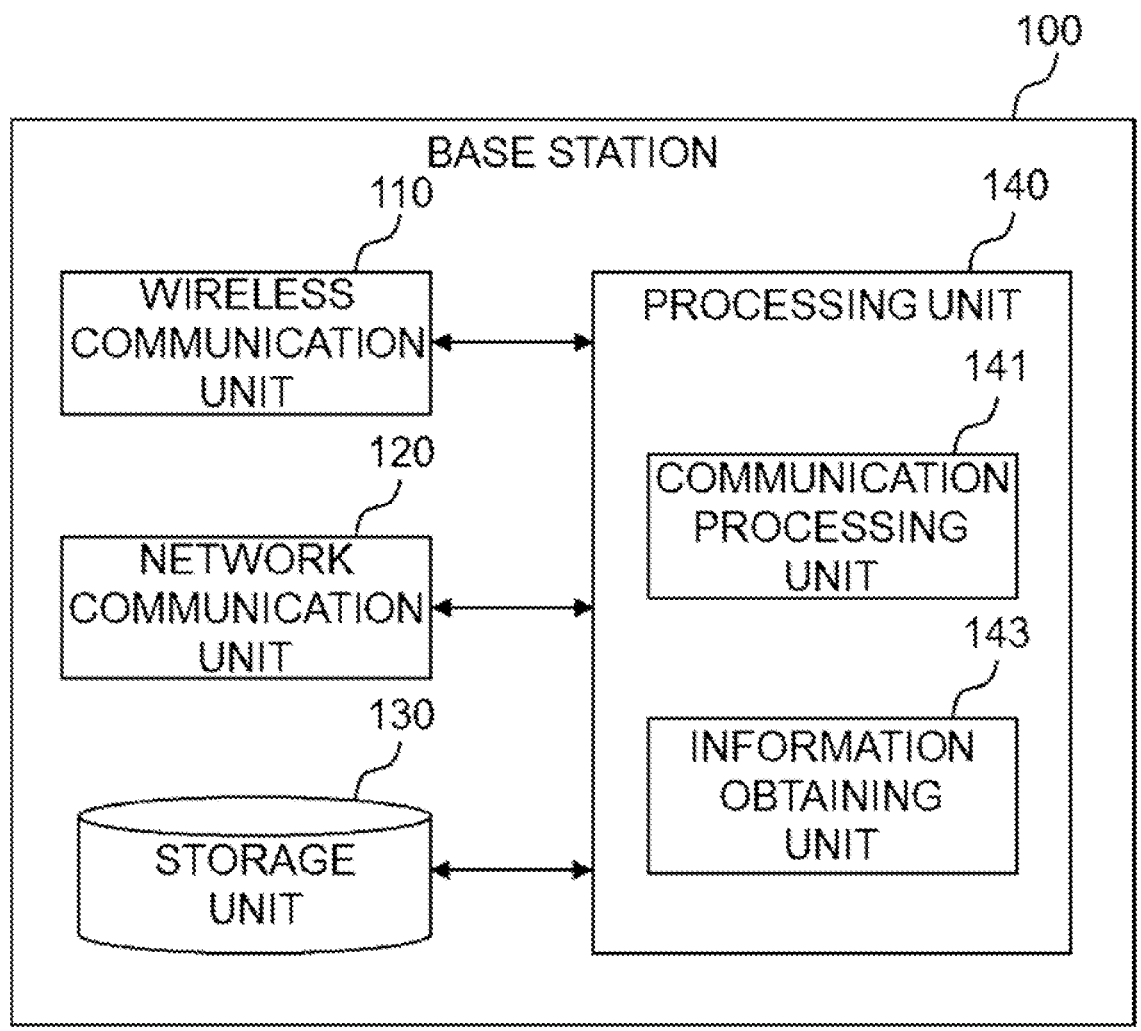
FIG. 7 is a block diagram illustrating an example of a schematic configuration of base station 100 according to a first example embodiment.

With reference to FIG. 7, an example of a configuration of a base station 100 according to the first example embodiment is described. FIG. 7 is a block diagram illustrating an example of a schematic configuration of the base station 100 according to the first example embodiment. According to FIG. 7, the base station 100 includes a wireless communication unit 110, a network communication unit 120, a storage unit 130, and a processing unit 140.

(1) Wireless Communication Unit 110

The wireless communication unit 110 transmits and receives signals wirelessly. For example, the wireless communication unit 110 receives a signal from a terminal apparatus and transmits a signal to a terminal apparatus.

(2) Network Communication Unit 120

The network communication unit 120 receives a signal from a network and transmits a signal to a network.

(3) Storage Unit 130

The storage unit 130 temporarily or permanently stores programs (instructions) and parameters for operations of the base station 100 as well as various data. The program includes one or more instructions for operations of the base station 100.

(4) Processing Unit 140

The processing unit 140 provides various functions of the base station 100. The processing unit 140 includes a communication processing unit 141 and an information obtaining unit 143. Note that the processing unit 140 may further include a constituent component other than these constituent components. In other words, the processing unit 140 may also perform operations other than the operations of these constituent elements. Concrete operations of the communication processing unit 141 and the information obtaining unit 143 will be described later in detail.

For example, the processing unit 140 (the communication processing unit 141) communicates with a terminal apparatus (e.g., the terminal apparatus 200) via the wireless communication unit 110.

(5) Example Implementation

The wireless communication unit 110 may be implemented by an antenna, a radio frequency (RF) circuit, and the like, and the antenna may be a directional antenna. The network communication unit 120 may be implemented by a network adapter and/or a network interface card, and the like. The storage unit 130 may be implemented a memory (e.g., a nonvolatile memory and/or volatile memory) and/or a hard disk, and the like. The processing unit 140 may be implemented by one or more processors such as a baseband (BB) processor and/or other types of processors, and the like. The communication processing unit 141 and the information obtaining unit 143 may be implemented by the same processor, or may be implanted separately by different processors. The memory (the storage unit 130) may be included in the one or more processors, or may be outside of the one or more processors.

The base station 100 may include a memory storing a program (instructions), and one or more processors capable of executing the program (the instructions). The one or more processors may execute the program to perform the operations of the processing unit 140 (operations of the communication processing unit 141 and/or the information processing unit 143). The program may be a program that causes a processor to execute the operations of the processing unit 140 (operations of the communication processing unit 141 and/or the information processing unit 143).

Note that the base station 100 may be virtualized. In other words, the base station 100 may be implemented as a virtualized machine. In this case, the base station 100 (the virtualized machine) may operate as a virtual machine on a physical machine (hardware) including a processor and a memory and a hypervisor.

4.2. Configuration of Terminal Apparatus

Figure 8:
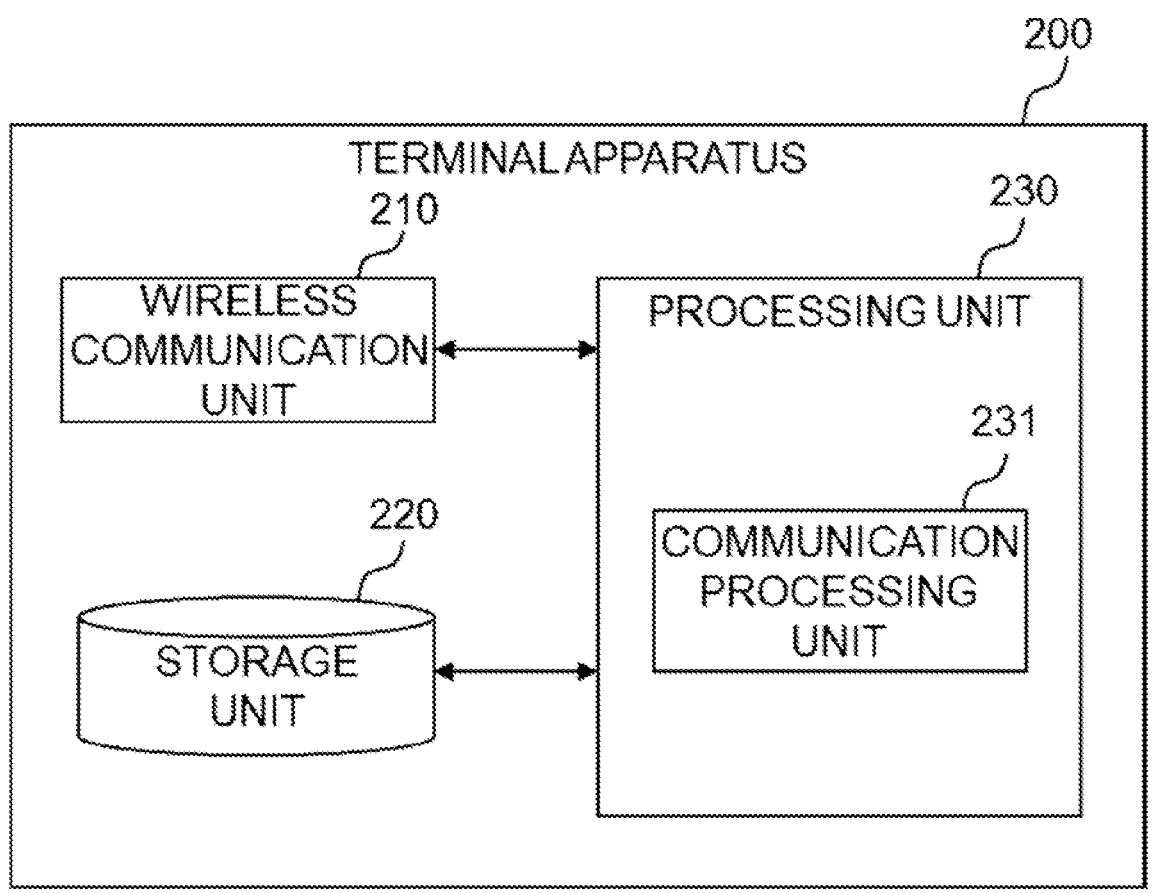
FIG. 8 is a block diagram illustrating an example of a schematic configuration of terminal apparatus 200 according to a first example embodiment.

With reference to FIG. 8, an example of a configuration of a terminal apparatus 200 according to the first example embodiment is described. FIG. 8 is a block diagram illustrating an example of a schematic configuration of the terminal apparatus 200 according to the first example embodiment. According to FIG. 8, the terminal apparatus 200 includes a wireless communication unit 210, a storage unit 220, and a processing unit 230.

(1) Wireless Communication Unit 210

The wireless communication unit 210 transmits and receives signals wirelessly. For example, the wireless communication unit 210 receives a signal from a base station and transmits a signal to a base station.

(2) Storage Unit 220

The storage unit 220 temporarily or permanently stores programs (instructions) and parameters for operations of the terminal apparatus 200 as well as various data. The program includes one or more instructions for operations of terminal apparatus 200.

(3) Processing Unit 230

The processing unit 230 provides various functions of the terminal apparatus 200. The processing unit 230 includes a communication processing unit 231. Note that the processing unit 230 may further include constituent components other than these constituent components. In other words, the processing unit 230 may also perform operations other than the operations of these constituent elements. Concrete operations of the communication processing unit 231 will be described later in detail.

For example, the processing unit 230 (the communication processing unit 231) communicates with a base station (e.g., the base station 100) via the wireless communication unit 210.

(4) Example Implementation

The wireless communication unit 210 may be implemented by an antenna, a radio frequency (RF) circuit, and the like. The storage unit 220 may be implemented by a memory (e.g., a nonvolatile memory and/or volatile memory) and/or a hard disk, and the like. The processing unit 230 may be implemented by one or more processors such as a baseband (BB) processor and/or other types of processors, and the like. The communication processing unit 231 may be implemented by the same processor, or may be implanted separately by different processors. The memory (the storage unit 220) may be included in the one or more processors, or may be outside of the one or more processors. As one example, the processing unit 230 may be implemented in a system on chip (SoC).

The terminal apparatus 200 may include a memory storing a program (instructions), and one or more processors capable of executing the program (the instructions). The one or more processors may execute the program to perform operations of the processing unit 230 (operations of the communication processing unit 231). The program may be a program that causes a processor to execute the operations of the processing unit 230 (operations of the communication processing unit 231).

4.3. Technical Features

Next, technical features of the first example embodiment are described.

The base station 100 (the communication processing unit 141) communicates with a first terminal apparatus (the terminal apparatus 200A) in a bandwidth part of an uplink system band, the bandwidth part being used by the first terminal apparatus (the terminal apparatus 200A). The first terminal apparatus (the communication processing unit 231 of the terminal apparatus 200A) communicates with the base station 100 in the bandwidth part. The bandwidth part includes a physical uplink control channel region used by the first terminal apparatus (the terminal apparatus 200A).

According to such configuration, for example, it is possible for the first terminal apparatus (the terminal apparatus 200A) to transmit a physical uplink control channel to the base station 100 without retuning regardless of the bandwidth part used by the first terminal apparatus (the terminal apparatus 200A). More specifically, it is possible for the first terminal apparatus (terminal apparatus 200A) to transmit a physical uplink control channel to the base station 100 without retuning even if the bandwidth part of the first terminal apparatus (the terminal apparatus 200A) is smaller than the uplink system band.

(1) Bandwidth Part

The bandwidth part may include a plurality of physical uplink control channel regions used by the first terminal apparatus (the terminal apparatus 200A). Here, each of the plurality of physical uplink control channel regions may be separated from each other in frequency direction.

For example, when frequency hopping is performed for transmission of a physical uplink control channel, one of the plurality of physical uplink control channel regions may be a region for transmitting a physical uplink control channel before frequency hopping, and another one of the other physical uplink control channels may be a region for transmitting a physical uplink control channel after frequency hopping.

In addition, the uplink system band includes a plurality of subbands, and each of the plurality of subbands includes a plurality of resource blocks contiguous in frequency direction. In the uplink system band with such configuration, the bandwidth part includes one or more of the plurality of subbands.

In addition, the bandwidth part may be one or more of the plurality of subbands. That is, a size and a position of the bandwidth part may be determined by one or more subbands.

Furthermore, the bandwidth part may be configured to correspond to a specific numerology. The specific numerology may be a parameter based on at least any one of subcarrier spacing, a transmission time interval (TTI), and a cyclic prefix (CP) type. In addition, one or more bandwidth parts may be set semi-statically for a terminal apparatus per component carrier (CC).

Note that when a plurality of bandwidth parts are set for one terminal apparatus, different numerologies may be set for the plurality of bandwidth parts respectively. Different numerologies may be set as scalable values, for example, by setting a basic subcarrier spacing $f_0$ to be 15 kHz and other subcarrier spacing to be $f_{sc}=2^n \times f_0$, etc. That is, subcarrier spacing may be a scalable value of a power of 2. In addition, a different CP type may be set for each of the plurality of bandwidth parts. That is, any one of Normal CP and Extended CP may be set for each bandwidth part.

Furthermore, the bandwidth part used by the first terminal apparatus (the terminal apparatus 200A) may include one or more of subbands included in a bandwidth part used by a second terminal apparatus (terminal apparatus 200B) different from the first terminal apparatus (the terminal apparatus 200A).

Example configuration of specific subbands will be described later.

(2) Physical Uplink Control Channel Region

The physical uplink channel region is located within a subband included in the bandwidth part.

For example, when the bandwidth part includes two or more subbands, the physical uplink control channel region is located within one subband out of the two or more subbands included in the bandwidth part.

Note that, the physical uplink control channel region may be located within a subband at the edge of the two or more subbands. Here, the subband at the edge is a subband which is the lowest in frequency direction out of the two or more subbands, or a subband which is the highest in frequency direction out of the two or more subbands.

Here, when the bandwidth part includes a plurality of physical uplink control channel regions separated from each other in frequency direction as described above, respective physical uplink control channel regions are for example a first physical uplink control channel region and a second physical uplink control channel region. In this case, as one example, the first physical uplink control channel region and the second physical uplink control channel region are located within different subbands. That is, the first physical uplink control channel region is located within one subband out of the two or more subbands included in the bandwidth part, and the second physical uplink control channel region is located within one subband out of the two or more subbands included in the bandwidth part, the one subband being different from a subband within which the first physical uplink control channel region is located. Note that the first physical uplink control channel region and the second physical uplink control channel region are not limited to the above case, and may be included at positions separated from each other in frequency direction within the same subband.

Furthermore, the physical uplink control channel region is located in a predetermined portion within the subband. Here, the predetermined portion is a portion at the edge of the subband, or a portion spaced from the edge of the subband with a predetermined gap. For example, the physical uplink control channel region may be located between the edge of the subband and a portion spaced from the edge by 20%, 25% and/or 50% of a bandwidth of the subband.

Candidate Band

The physical uplink control channel region may be located within one candidate band out of two or more candidate bands in the bandwidth part. Each of the two or more candidate bands is one subband within the bandwidth part, or two or more subbands contiguous in frequency direction within the bandwidth part.

For example, specific positions of the first and the second physical uplink control channel region are as follows. For example, when a candidate band within which the physical uplink control channel region is located includes one subband, the first physical uplink control channel region is located at an edge of the subband, and the second physical uplink control channel region is located at another edge of the subband. On the other hand, when a candidate band within which the physical uplink control channel region is located includes two or more subbands contiguous in frequency direction, the first physical uplink control channel region is located within a subband located at an edge of the candidate band, and the second physical uplink control channel region is located within a subband located at another edge of the candidate band.

(3) Control Information

The base station 100 (the information obtaining unit 143) obtains first control information for specifying the physical uplink control channel region, and the base station 100 (the communication processing unit 141) transmits the first control information to the first terminal apparatus (the terminal apparatus 200A).

When the physical uplink control channel region is located within a subband included in the bandwidth part as described above, control information for specifying a subband within which the physical uplink control channel region is located is used as the first control information.

On the other hand, when the physical uplink control channel region is located within one candidate band out or the two or more candidate bands within the bandwidth part as described above, control information for identifying a candidate band within which the physical uplink control channel region is located is used as the first control information.

Specifically, for example, the following two types of indexes are used as the first control information. First, one index is an index (referred to as an absolute index below) for identifying a candidate band within which the physical uplink control channel region is located out of a plurality of candidate bands within the uplink system band. Another index is an index (referred to as a relative index below) for identifying a candidate band within which the physical uplink control channel region is located out of the two or more candidate bands within the bandwidth part.

For example, when there is an agreement, between a base station and a terminal apparatus, that a physical uplink control channel region is located within a subband located at the edge of a candidate band, it is possible for the first terminal apparatus (the terminal apparatus 200A) to specify a subband within which the physical uplink control channel region is located by identifying a candidate band based on the index.

In addition, for example, the base station 100 (the communication processing unit 141) may transmit downlink control information (DCI) including the index to the first terminal apparatus (the terminal apparatus 200A). The base station 100 (the communication processing unit 141) may transmit a media access control (MAC) control element including the index to the first terminal apparatus (the terminal apparatus 200A).

When a candidate band within which the physical uplink control channel region is located is identified by the first control information as described above, the base station 100 (the information obtaining unit 143) may obtain second control information for specifying the two or more candidate bands. Then, the base station 100 (the communication processing unit 141) may transmit the second control information to the first terminal apparatus (the terminal apparatus 200A).

Specifically, the base station 100 (the communication processing unit 141) transmits a MAC control element including the second control information to the first terminal apparatus (the terminal apparatus 200A). Note that the base station 100 (the communication processing unit 141) may transmit a radio resource control (RRC) message including the second control information to the first terminal apparatus (the terminal apparatus 200A).

4.4. Specific Examples

Next, specific examples of processing performed in the system 1 is described.

(1) Specific Examples of Subbands

First Specific Example

Figure 9:
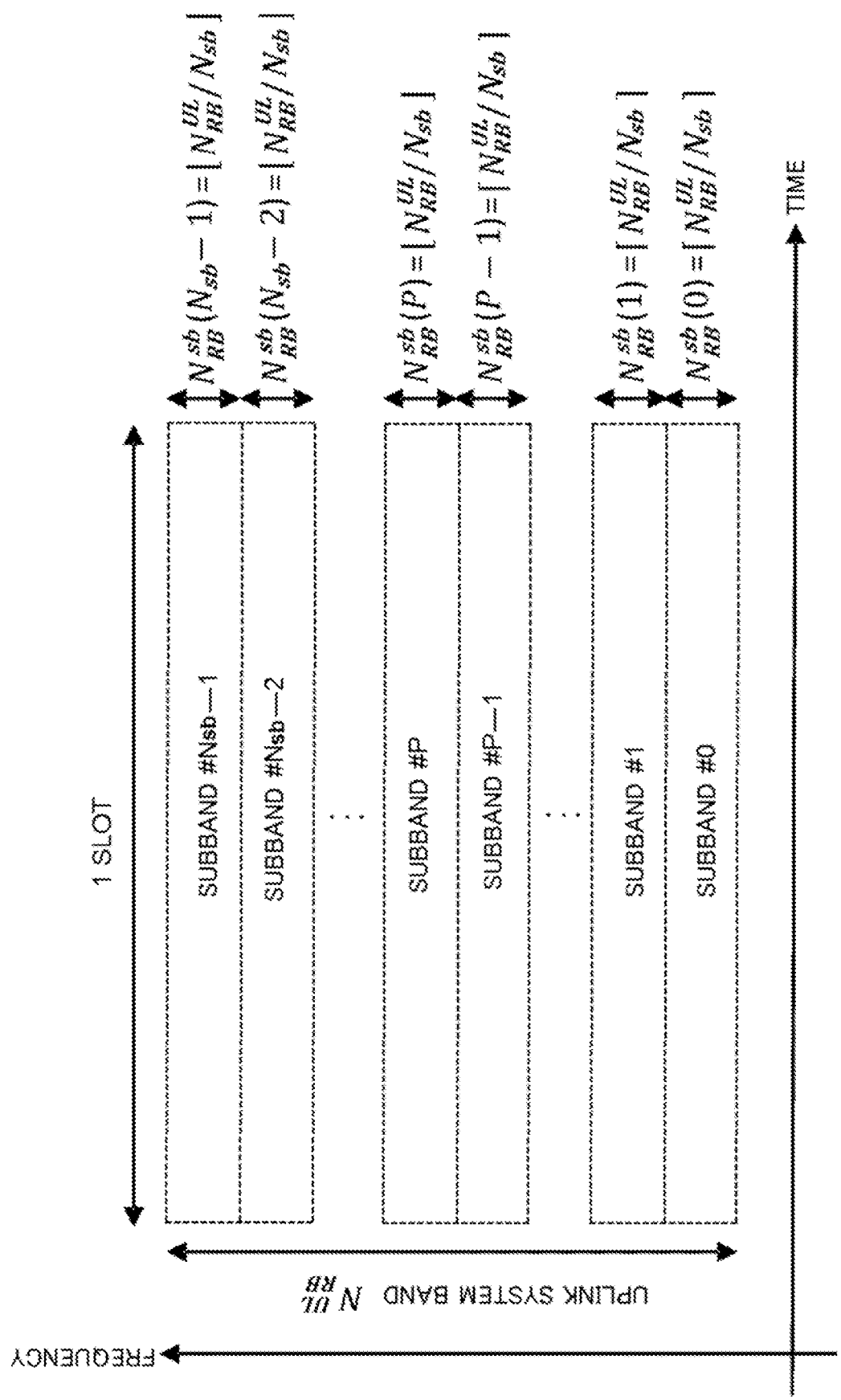
FIG. 9 is a diagram illustrating subbands according to a first specific example.

FIG. 9 is a diagram illustrating subbands according to a first specific example. In the first specific example, as described in FIG. 9, subbands are set by dividing an uplink system band equally by the number of subbands, $N_{sb}$. Note that, if the number of RBs of an uplink system band, $N^{UL}_{RB}$ is indivisible by $N_{sb}$, a difference between numbers of RBs of subbands can be equal to or less than 1 by the following formula as one example:

$$P = N^{UL}_{RB} - N_{sb} \lfloor N^{UL}_{RB}/N_{sb} \rfloor \qquad \text{[Math. 1]}$$

$$N^{sb}_{RB}(n) = \begin{cases} \lceil N^{UL}_{RB}/N_{sb} \rceil & \text{if } n < P \\ \lfloor N^{UL}_{RB}/N_{sb} \rfloor & \text{otherswise} \end{cases}$$

wherein $N^{sb}_{RB}(n)$ represents the number of RBs of n-th subband.

As one example, when the number of RBs of an uplink system band, $N^{UL}_{RB}$ is 275 and the number of subbands, $N_{sb}$ is 10, P=5 according to the above formula. That is, each of 0th to 4th subbands includes 28 RBs, and each of 5th to 9th subbands includes 27 RBs.

In addition, the number of RBs per subband, $N_{RB}$ may be assigned. Here, when the number of RBs of an uplink system band, $N^{UL}_{RB}$ is indivisible by $N_{RB}$, the number of RBs of a subband located at any one edge of an uplink system band may be $N^{UL}_{RB}$ mod $N_{RB}$ as one example.

Second Specific Example

FIG. 10 is a diagram illustrating subbands according to a second specific example. In the second specific example, a reserved region is set as shown in FIG. 10.

Here, the reserved region is a region for securing a static Long PUCCH resource per terminal apparatus. Specifically, for example, the reserved region is used as a Long PUCCH resource for a terminal apparatus to transmit, to a base station, any requests, e.g. a scheduling request (SR) and Beam Failure recovery request, and as a Long PUCCH resources for transmitting periodic channel state information (CSI). It is preferable to use RBs at both edges of an uplink system band as such a Long PUCCH resource of a reserved region. This is for avoiding reduction of the number of contiguous RBs which can be allocated dynamically, due to separation of an uplink system band by statically allocated resources.

Therefore, in the second specific example, a total of $N^{rsv}_{RB}$ RBs at both edges of an uplink system band is a reserved region as shown in FIG. 9. In addition, in the second specific example, the number of RBs excluding $N^{rsv}_{RB}$ RBs from an uplink system band, $N'^{UL}_{RB}$ is divided equally by the number of subbands, $N_{sb}$. Note that, if $N'^{UL}_{RB}$ is indivisible by $N_{sb}$, a difference between numbers of RBs of subbands can be equal to or less than 1 by the following formula as one example:

$$N'^{UL}_{RB} = N^{UL}_{RB} - N^{rsv}_{RB} - (N^{rsv}_{RB} \bmod 2) \qquad \text{[Math. 2]}$$

$$P' = N'^{UL}_{RB} - N_{sb} \lfloor N'^{UL}_{RB}/N_{sb} \rfloor$$

$$N'^{sb}_{RB}(n) = \begin{cases} \lceil N'^{UL}_{RB}/N_{sb} \rceil & \text{if } n < P' \\ \lfloor N'^{UL}_{RB}/N_{sb} \rfloor & \text{otherswise} \end{cases}$$

wherein $N'^{sb}_{RB}(n)$ represents the number of RBs of n-th subband.

As one example, the number of RBs of an uplink system band, $N^{UL}_{RB}$ is 275, the number of subbands, $N_{sb}$ is 10, and a total of 8 RBs including 4 RBs from each band edge is a reserved region. In this case, according to the above formula, P'=7. That is, each of 0th to 6th subbands includes 27 RBs, and each of 7th to 9th subbands includes 26 RBs.

In addition, the number of RBs per subband, $N_{RB}$ may be assigned. Here, when the number of RBs excluding $N^{rsv}_{RB}$ RBs from an uplink system band, $N'^{UL}_{RB}$ is indivisible by $N_{RB}$, the number of RBs of a subband located at any one edge out of a band obtained by excluding $N^{rsv}_{RB}$ RBs from an uplink system band may be $N'^{UL}_{RB}$ mod $N_{RB}$ as one example.

Notification of Configuration of Subbands

The number of subbands $N_{sb}$ or the number of RBs per subband $N_{RB}$ may be transmitted per cell, per terminal apparatus, or per group to which terminal apparatuses belongs.

In addition, the number of subbands $N_{sb}$ or the number of RBs per subband $N_{RB}$ may be included in Remaining Minimum System Information (RMSI), and/or may be included in an RRC message.

In addition, when an increase of overhead is allowed, a position of a start RB and the number of contiguous RBs per subband may be set.

(2) Specific Example of Candidate Band

The base station 100, for example, sets the two or more candidate bands out of two or more subbands included in the bandwidth part when the base station 100 sets the bandwidth part for the first terminal apparatus (the terminal apparatus 200A). Then, when the bandwidth part set for the first terminal apparatus (the terminal apparatus 200A) becomes active, the base station 100 identifies one candidate band out of the two or more candidate bands, and notifies the first terminal apparatus (the terminal apparatus 200A) of information indicating the identified candidate band as the first control information. Then the first terminal apparatus (the terminal apparatus 200A) transmits a Long PUCCH using RBs within subbands located at both edges of a candidate band which the first terminal apparatus is notified of by the base station 100.

For example, the candidate band is uniquely identified by a combination of a start position of subbands $SB_{start}$, and the number of contiguous subbands $L_{CSBs}$. A set value X uniquely specifying this combination can be calculated by the following formula:

if $(L_{CSBs}-1) \leq \lfloor N_{sb}/2 \rfloor$ then $X = N_{sb}(L_{CSBs}-1) + SB_{start}$ else $X = N_{sb}(N_{sb}-L_{CSBs}+1) + (N_{sb}-1-SB_{start})$ [Math. 3]

wherein the number of bits of the set value X is as follows:

$\lceil \log_2(N_{sb}(N_{sb}+1)/2) \rceil$ [Math. 4]

Note that the base station 100 may not set a candidate band, and may directly notify the first terminal apparatus (the terminal apparatus 200A) of the set value X using a MAC control element and/or DCI. For such a notification way, for example, when the number of subbands $N_{sb}$ is 10, 6 bits would be needed for transmission of the set value X. In particular, in case of notification of the set value X using DCI, the 6 bits is high overhead.

Therefore, the base station 100 notifies, in advance, the first terminal apparatus (the terminal apparatus 200A) of the second control information for specifying the two or more candidate bands. Then, the base station 100 transmits, to the first terminal apparatus (the terminal apparatus 200A), only the index (the first control information) for identifying one candidate band out of the two or more candidate bands, using a MAC CE and/or DCI. This makes it possible to reduce the number of bits for identifying a candidate band within which the physical uplink control channel region is located.

Next, candidate bands set for two types of terminal groups whose bandwidth parts are different is described. First, a bandwidth part which has the same bandwidth as an uplink system band is set for a terminal group A, and a bandwidth part which has a smaller bandwidth than the uplink system band is set for a terminal group B. As one example, if uplink system bandwidth is 50 MHz, the terminal group A includes a plurality of terminal apparatuses whose maximum transmission bandwidths are 50 MHz, and the terminal group B includes a plurality of terminal apparatuses whose maximum transmission bandwidths are 25 MHz. For example, the first terminal apparatus (the terminal apparatus 200A) is included in the terminal group B, and the second terminal apparatus (the terminal apparatus 200B) is included in the terminal group A. Note that, the terminal group B may include a terminal apparatus whose maximum transmission bandwidth is 50 MHz as a bandwidth of a bandwidth part is equal to or smaller than a maximum transmission bandwidth of a terminal apparatus.

Figure 11:
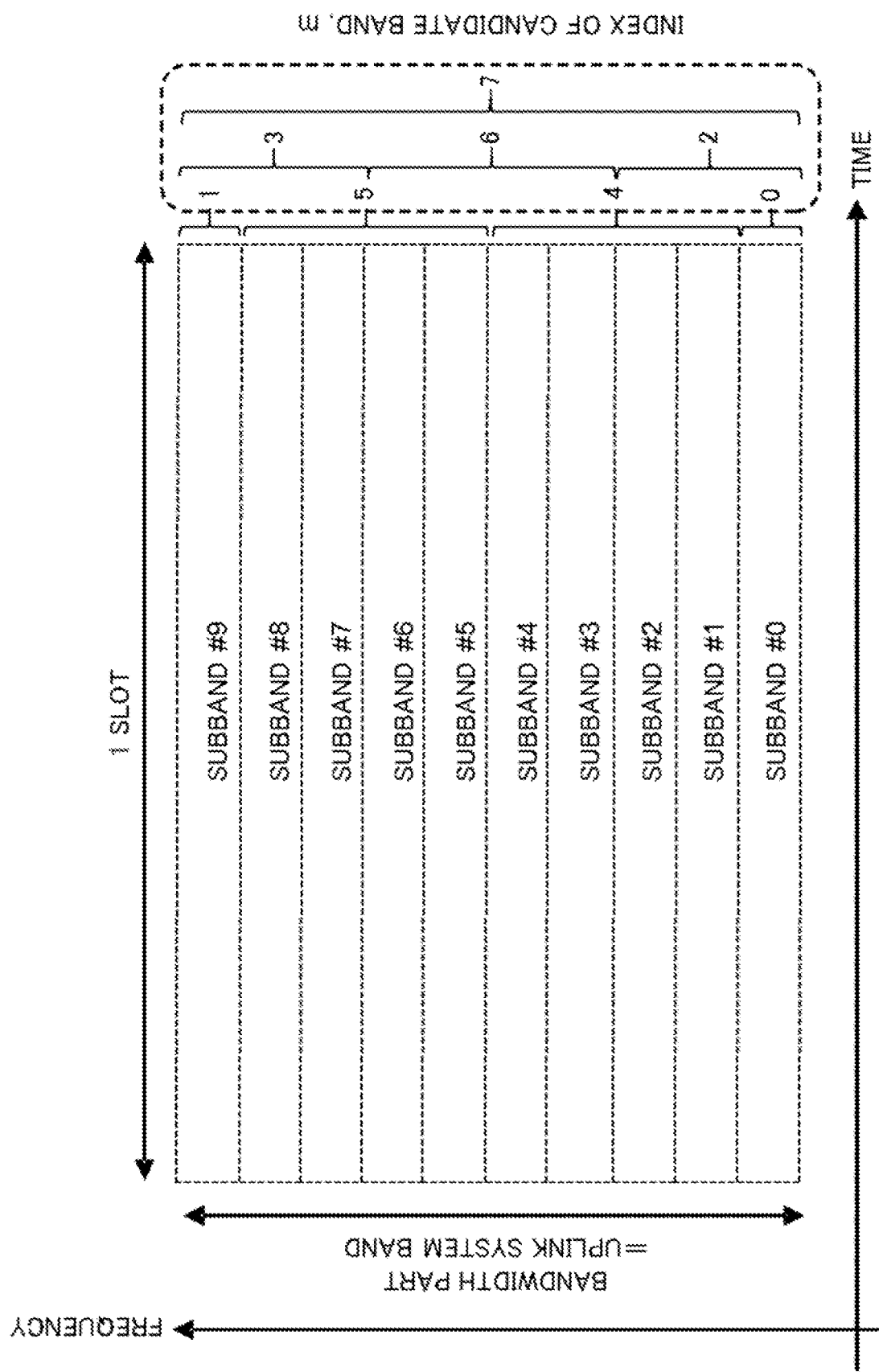
FIG. 11 is a diagram illustrating a specific example of two or more candidate bands set for a terminal group A.

FIG. 11 is a diagram illustrating a specific example of two or more candidate bands set for terminal group A. When 8 candidate bands are set for the terminal group A as shown in FIG. 11, a set value table of following Table 1 is given and transmitted as the second control information. For example, an RRC message and/or a MAC CE can be used as a notification method of the set value table.

TABLE 1

| Index of Candidate Band, m | Start Position of Subbands, $SB_{start}$ | Number of Contiguous Subbands, $L_{CSBs}$ | Set Value, X |
|---|---|---|---|
| 0 | 0 | 1 | 0 |
| 1 | 9 | 1 | 9 |
| 2 | 0 | 3 | 20 |
| 3 | 7 | 3 | 27 |
| 4 | 1 | 4 | 31 |
| 5 | 5 | 4 | 35 |
| 6 | 3 | 4 | 33 |
| 7 | 0 | 10 | 19 |

The base station 100 notifies the terminal group A of index m of a candidate band, within which the physical uplink control channel region is located, out of these candidate bands using a MAC CE and/or DCI. As the number of bits necessary for this notification is 3, the number of bits can be reduced as compared to the case of direct notification of the set value X using 6 bits as described above.

Figure 12:
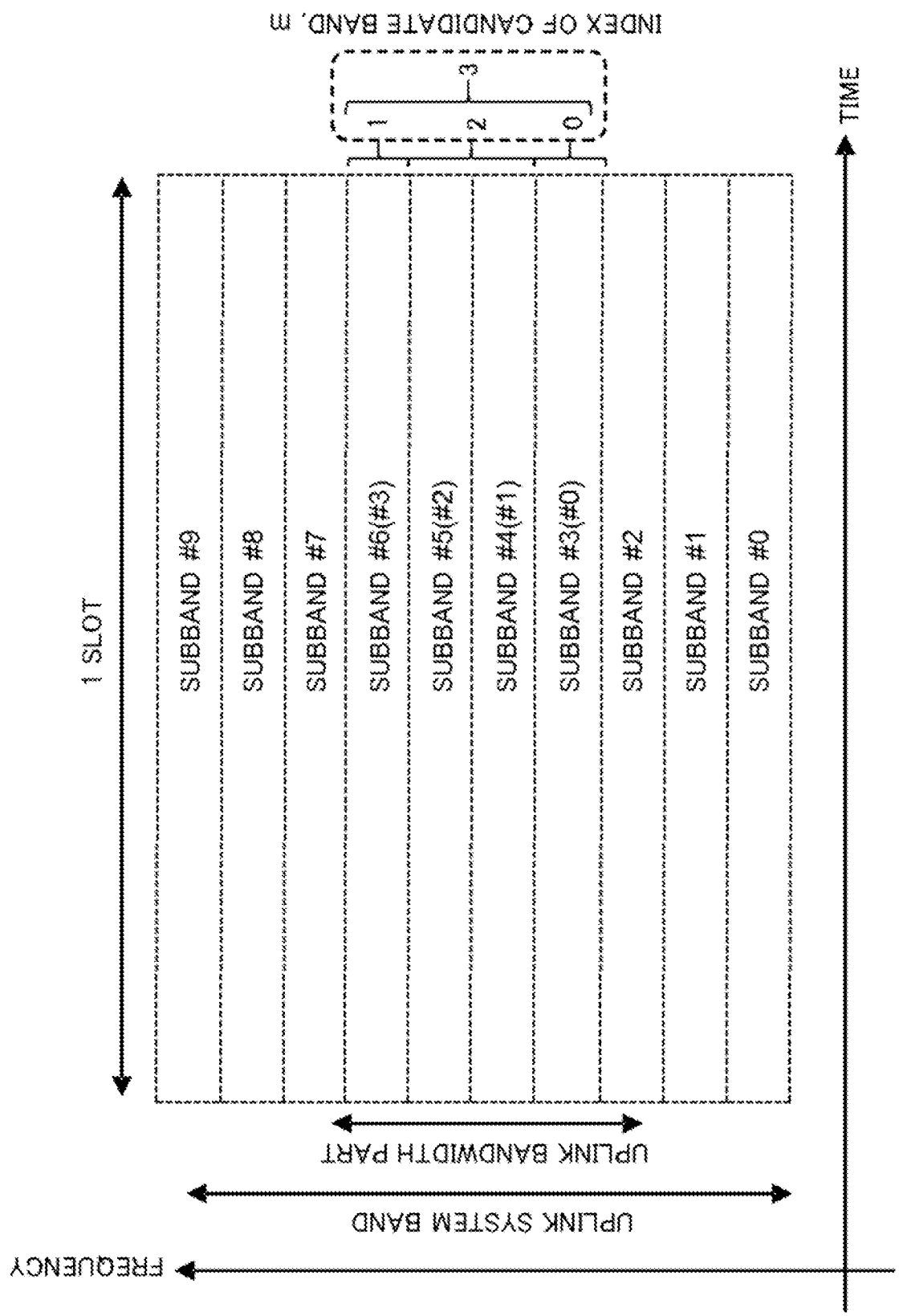
FIG. 12 is a diagram illustrating a specific example of two or more candidate bands set for a terminal group B.

FIG. 12 is a diagram illustrating a specific example of two or more candidate bands set for a terminal group B. As shown in FIG. 12, when four candidate bands are set for the terminal group B, a set value X can be assigned by the absolute index or the relative index, for example.

In the specific example shown in FIG. 12, for example, the absolute index can identify each of candidate bands based on absolute subband numbers uniquely identifying respective subbands #0-#9 included in an uplink system band. In addition, for example, the relative index can identify each of candidate bands based on relative subband numbers uniquely identifying respective subbands (#0)-(#3) included in a bandwidth part.

When the absolute index is used, a set value table of following Table 2 is given and transmitted as the second control information. Here, "Start Position of Subbands, $SB_{start}$" represents a start position based on the absolute subband numbers. For example, an RRC message and/or a MAC CE can be used as a notification method of the set value table.

TABLE 2

| Index of Candidate Band, m | Start Position of Subbands, $SB_{start}$ | Number of Contiguous Subbands, $L_{CSBs}$ | Set Value, X |
|---|---|---|---|
| 0 | 3 | 1 | 3 |
| 1 | 6 | 1 | 6 |
| 2 | 4 | 2 | 14 |
| 3 | 3 | 4 | 33 |

When the relative index is used, a set value table of following Table 3 is given and transmitted as the second control information. Here, "Start Position of Subbands, $SB_{start}$," represents a start position based on the relative subband numbers. For example, an RRC message and/or a MAC CE can be used as a notification method of the set value table.

TABLE 3

| Index of Candidate Band, m | Start Position of Subbands, $SB_{start}$ | Number of Contiguous Subbands, $L_{CSBs}$ | Set Value, X |
|---|---|---|---|
| 0 | 0 | 1 | 0 |
| 1 | 3 | 1 | 3 |
| 2 | 1 | 2 | 5 |
| 3 | 0 | 4 | 7 |

As apparent from Table 2 and Table 3, the number of bits necessary for notification of a set value table is 6×4=24 in case of using the absolute index, and is 4×4=16 in case of using the relative index. Therefore, when the number of bits is variable, the number of bits can be reduced by using the relative index. On the other hand, when the absolute index is used, there is an advantage that setting of a bandwidth part and notification of a set value table can be performed independently.

Example of Notification of Candidate Band within which Physical Uplink Control Channel Region is Located After the terminal group A and the terminal group B are respectively informed of the set value table, the base station 100 notifies a terminal apparatus of an index m of a candidate band used for transmission of HARQ-ACK information, that is an index m of a candidate band within which a physical uplink control channel is located.

As a notification method of this index m, DCI for scheduling a PDSCH corresponding to the HARQ-ACK information may be used. This enables dynamic notification of index m per transmission of a PDSCH, i.e. per transmission of HARQ-ACK information, and enables flexible uplink scheduling.

In addition, a system may be set such that the index m is switched dynamically per number of subframes corresponding to a repetition number when the DCI includes the repetition number. Furthermore, the DCI may include control information indicating that the index m is switched dynamically per number of subframes corresponding to a repetition number. Note that the index m may be different between subframes transmitted repeatedly and control information indicating this may be included in the DCI.

Note that the index m may be transmitted using an RRC message and/or a MAC CE when dynamic control is not needed.

Figure 13:
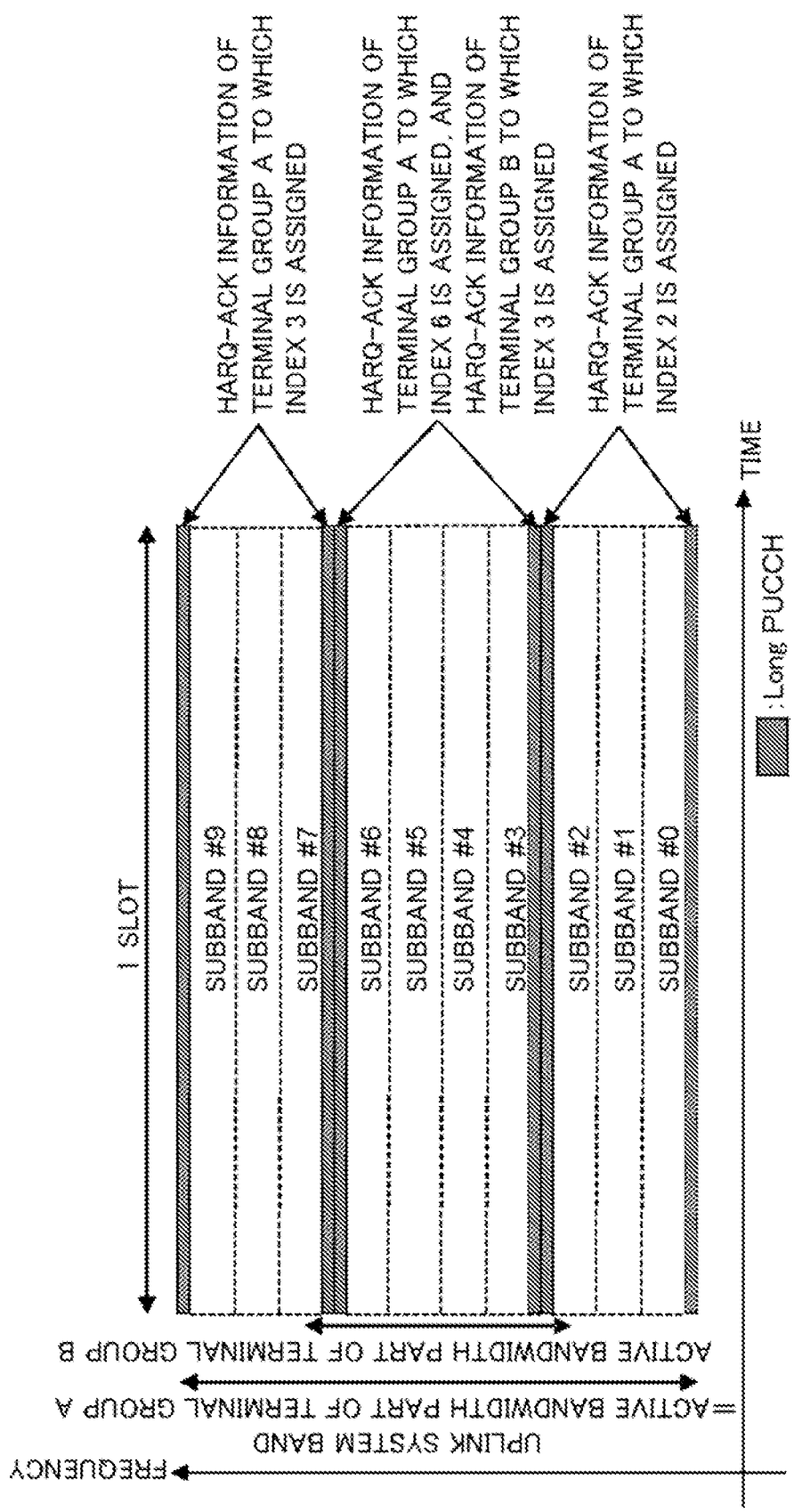
FIG. 13 is a diagram illustrating positions of Long PUCCHs used by a terminal group A and a terminal group B respectively.

FIG. 13 is a diagram illustrating positions of Long PUCCHs used by a terminal group A and a terminal group B respectively. In example notification shown in FIG. 13, it is assumed that the terminal group A is notified of indexes m=2, 3, 6, and the terminal group B is notified of an index m=3. Portions other than Long PUCCHs can be used as contiguous bands which can be allocated for PUSCH transmission respectively in a band in which subband numbers (absolute subband numbers in an example of FIG. 13) are from #0 to #2, a band in which subband numbers are from #3 to #6, and a band in which subband numbers are from #7 to #9.

As described above, although the terminal group A and the terminal group B have different active bandwidth parts from each other, it is possible to concentrate and allocate all Long PUCCHs near borders of common subbands by using physical uplink control channel regions located within the common subbands. This makes it possible to multiplex Long PUCCHs efficiently and suppress fragmentation of radio resources.

Example Placement of Physical Uplink Control Channels within Subband or Candidate Band A terminal apparatus needs to specify a relative resource number for a Long PUCCH resource within a subband or a candidate band as well as the subband or the candidate band within which a physical uplink control channel region for transmitting HARQ-ACK information is located. By this relative resource number, a relative RB number within the subband or the candidate band and a resource number within an RB may be specified. The resource number within the RB may specify a cyclic shift number and/or an orthogonal cover code number to be applied to a Long PUCCH.

Note that, when frequency hopping is performed, this relative resource number may specify at least any one of a relative position of a physical uplink control channel region within a subband or a candidate band before frequency hopping, and a relative position of a physical uplink control channel region within a subband or a candidate band after frequency hopping.

Figure 14:
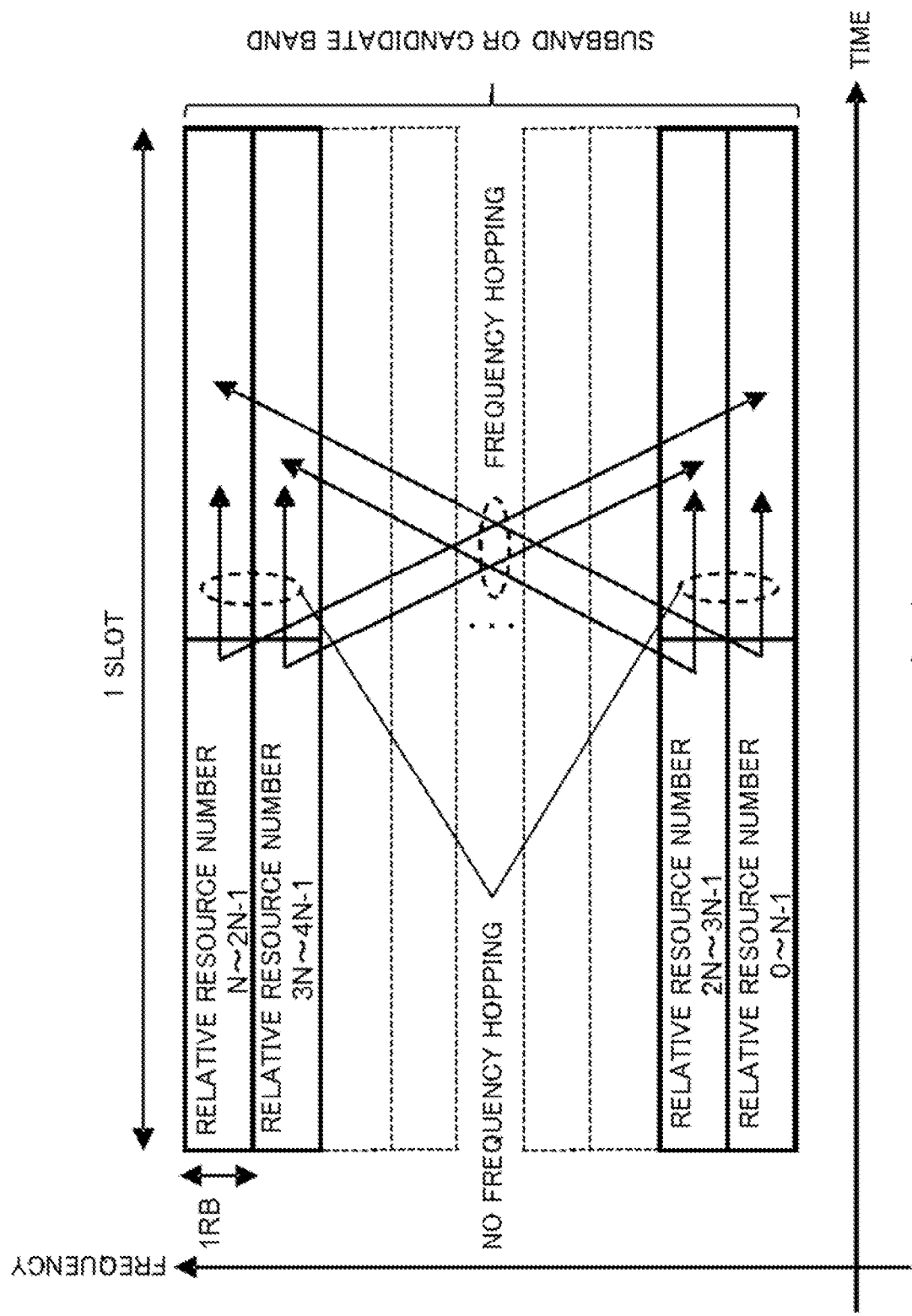
FIG. 14 is a diagram illustrating a specific example of relative resource number for Long PUCCH resources within a subband or a candidate band.

FIG. 14 is a diagram illustrating a specific example of relative resource number for Long PUCCH resources within a subband or a candidate band.

This relative resource number may be determined implicitly based on information on a resource in which a PDSCH corresponding to HARQ-ACK information is transmitted. An example of this information is a first OFDM symbol number, a first RB number, a last OFDM symbol number or a last RB number with which the PDSCH is scheduled, or a combination of any of them.

In addition, the relative resource number may be determined implicitly based on information on a PDCCH resource in which DCI for scheduling a PDSCH is transmitted. An example of this information is a first OFDM symbol number, a first RB number, a last OFDM symbol number, a last RB number, a first or last index of a resource element group (REG), or a first or last index of control channel element (CCE) index with which the PDCCH is transmitted, or a combination of any of them.

In addition, the relative resource number may be assigned directly in a MAC CE and/or DCI.

Furthermore, a part of the relative resource number may be assigned directly in a MAC CE and/or DCI, and a remaining part may be determined in the above described implicit manner.

On/off of frequency hopping at the time of Long PUCCH transmission may be assigned semi-statically per terminal or per bandwidth part or candidate band set for a terminal. Alternatively, dynamic assignment may be done by including a flag indicating on/off of frequency hopping in DCI.

5. Second Example Embodiment

Next, the second example embodiment of the present disclosure is described with reference to FIG. 15 and FIG. 16. The above described first example embodiment is a specific example embodiment, while the second example embodiment is more generalized example embodiment.

5.1. Configuration of Base Station

Figure 15:
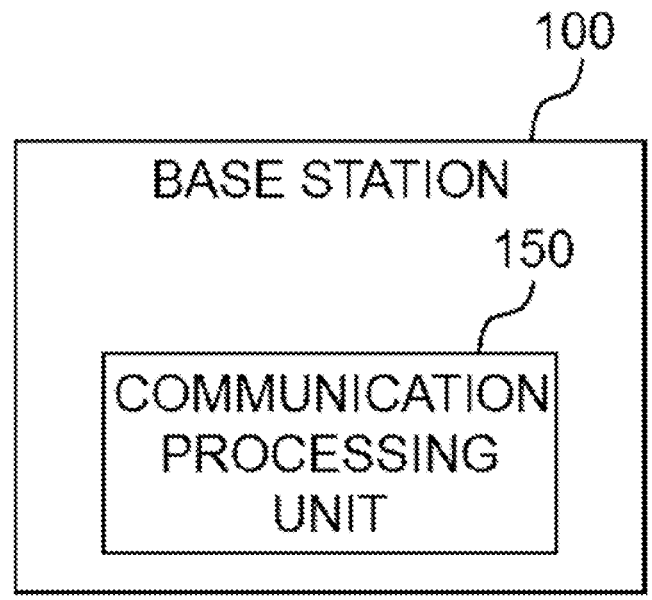
FIG. 15 is a block diagram illustrating an example of a schematic configuration of base station 100 according to a second example embodiment.

With reference to FIG. 15, an example of a configuration of a base station 100 according to the second example embodiment is described. FIG. 15 is a block diagram illustrating an example of a schematic configuration of the base station 100 according to the second example embodiment. According to FIG. 15, the base station 100 includes a communication processing unit 150. Concrete operations of the communication processing unit 150 will be described later.

The communication processing unit 150 may be implemented by one or more processors (a BB processor and/or other types of processors, and the like) and a memory. The memory may be included in the one or more processors, or may be outside of the one or more processors.

The base station 100 may include a memory storing a program (instructions), and one or more processors capable of executing the program (the instructions). The one or more processors may execute the program to perform the operations of the communication processing unit 150. The program may be a program that causes a processor to execute the operations of the communication processing unit 150.

Note that the base station 100 may be virtualized. In other words, the base station 100 may be implemented as a virtualized machine. In this case, the base station 100 (the virtualized machine) may operate as a virtual machine on a physical machine (hardware) including a processor and a memory and a hypervisor.

Note that, of course, the base station 100 may further include a constituent component other than the communication processing unit 150. For example, the base station 100 may further include a wireless communication unit 110, a network communication unit 120 and/or a storage unit 130 as well as the first example embodiment, and/or may further include other constituent components.

5.2. Configuration of Terminal Apparatus

Figure 16:
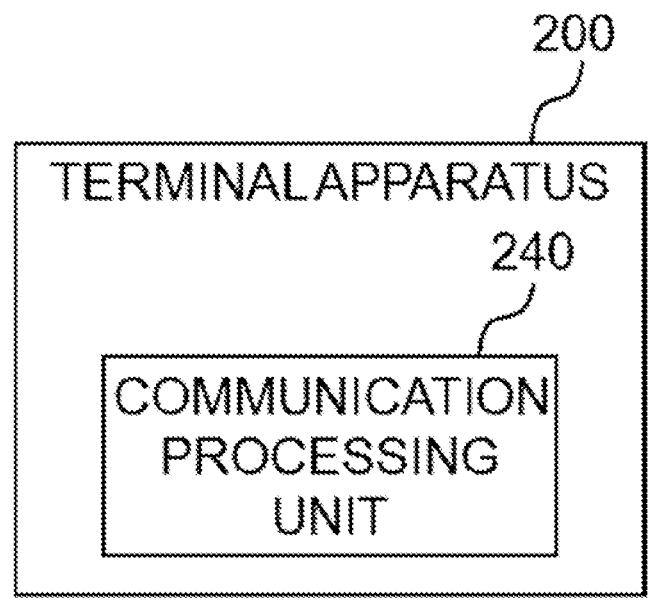
FIG. 16 is a block diagram illustrating an example of a schematic configuration of terminal apparatus 200 according to a second example embodiment.

With reference to FIG. 16, an example of a configuration of a terminal apparatus 200 according to the second example embodiment is described. FIG. 16 is a block diagram illustrating an example of a schematic configuration of the terminal apparatus 200 according to the second example embodiment. According to FIG. 16, the terminal apparatus 200 includes a communication processing unit 240. Concrete operations of the communication processing unit 240 will be described later.

The communication processing unit 240 may be implemented by one or more processors (a BB processor and/or other types of processors, and the like) and a memory. The memory may be included in the one or more processors, or may be outside of the one or more processors. As one example, the communication processing unit 240 may be implemented in a SoC.

The terminal apparatus 200 may include a memory storing a program (instructions), and one or more processors capable of executing the program (the instructions). The one or more processors may execute the program to perform operations of the communication processing unit 240. The program may be a program that causes a processor to execute the operations of the communication processing unit 240.

Note that, of course, the terminal apparatus 200 may further include a constituent component other than the communication processing unit 240. For example, the terminal apparatus 200 may further include a wireless communication unit 210 and/or a storage unit 220 as well as the first example embodiment, and/or may further include other constituent components.

5.3. Technical Feature

Technical features of the second example embodiment are described.

The base station 100 (the communication processing unit 150) communicates with a first terminal apparatus (the terminal apparatus 200) in a bandwidth part of an uplink system band, the bandwidth part being used by the first terminal apparatus (the terminal apparatus 200), and the first terminal apparatus (the communication processing unit 240 of the terminal apparatus 200) communicates with the base station 100 in the bandwidth part. The bandwidth part includes a physical uplink control channel region used by the first terminal apparatus (the terminal apparatus 200).

For example, this enables the first terminal apparatus to transmit a physical uplink control channel to the base station without retuning even if bandwidth parts are different between terminal apparatuses. More specifically, it is possible for the first terminal apparatus to transmit a physical uplink control channel to a base station without retuning even if a maximum transmission bandwidth of the first terminal apparatus is small.

As one example, descriptions about a bandwidth part, a physical uplink control channel region and/or control information are the same as the descriptions for the first example embodiment. Hence, overlapping descriptions are omitted here. Note that, in this case, the communication processing unit 150 may operate as well as the communication processing unit 141 of the first example embodiment, and the communication processing unit 240 may operate as well as the communication processing unit 231 of the first example embodiment.

Of course, the second example embodiment is not limited to these examples.

6. Other Example Aspects

While the example embodiments of the present disclosure have been described, the present disclosure is not limited to these example embodiments. It will be understood by those skilled in the art that these example embodiments are merely examples and various change can be made without departing from the scope and the spirit of the present disclosure.

For example, an apparatus (e.g. one or more apparatuses (or units) out of a plurality of apparatuses (or units) constituting the base station, or a module for one of the plurality of apparatuses (or units)) including constituent elements of the base station described herein (e.g. the communication processing unit and/or the information obtaining unit) may be provided. An apparatus (e.g. a module for the terminal apparatus) including constituent elements of the terminal apparatus described herein (e.g. the communication processing unit) may be provided. Moreover, methods including processing of such constituent elements may be provided, and programs for causing processors to execute processing of such constituent elements may be provided. Furthermore, non-transitory computer readable recording media having recorded thereon the program may be provided. Of course, such apparatuses, modules, methods, programs and non-transitory computer readable recording media are also included in the present disclosure.

Some of or all the above-described example embodiments can be described as in the following Supplementary Notes, but are not limited to the following.

(Supplementary Note 1)

A base station comprising:

a communication processing unit configured to communicate with a first terminal apparatus in a bandwidth part of an uplink system band, the bandwidth part being used by the first terminal apparatus, wherein the bandwidth part includes a physical uplink control channel region used by the first terminal apparatus.

(Supplementary Note 2)

The base station according to Supplementary Note 1, wherein the bandwidth part includes a plurality of physical uplink control channel regions used by the first terminal apparatus, and the plurality of physical uplink control channel regions are separated from each other in frequency direction.

(Supplementary Note 3)

The base station according to Supplementary Note 1 or 2, wherein the uplink system band includes a plurality of subbands, and the bandwidth part includes one or more of the plurality of subbands.

(Supplementary Note 4)

The base station according to Supplementary Note 3, wherein each of the plurality of subbands includes a plurality of resource blocks contiguous in frequency direction.

(Supplementary Note 5)

The base station according to Supplementary Note 3 or 4, wherein the bandwidth part is one or more of the plurality of subbands.

(Supplementary Note 6)

The base station according to any one of Supplementary Notes 3 to 5, wherein the physical uplink control channel region is located within a subband included in the bandwidth part.

(Supplementary Note 7)

The base station according to Supplementary Note 6, wherein the bandwidth part includes two or more subbands out of the plurality of subbands, and the physical uplink control channel region is located within one subband out of the two or more subbands included in the bandwidth part.

(Supplementary Note 8)

The base station according to Supplementary Note 7, wherein the physical uplink control channel region is located within a subband at the edge of the two or more subbands.

(Supplementary Note 9)

The base station according to Supplementary Note 7 or 8, wherein the bandwidth part includes a plurality of physical uplink control channel regions used by the first terminal apparatus, the plurality of physical uplink control channel regions includes a first physical uplink control channel region and a second physical uplink control channel region separated from the first physical uplink control channel region in frequency direction, the first physical uplink control channel region is located within one subband out of the two or more subbands included in the bandwidth part, and the second physical uplink control channel region is located within one subband out of the two or more subbands included in the bandwidth part, the one subband being different from a subband within which the first physical uplink control channel region is located.

(Supplementary Note 10)

The base station according to Supplementary Note 7, wherein the physical uplink control channel region is located within one candidate band out of two or more candidate bands within the bandwidth part, and each of the two or more candidate bands is one subband within the bandwidth part, or two or more subbands contiguous in frequency direction within the bandwidth part.

(Supplementary Note 11)

The base station according to any one of Supplementary Notes 7 to 10, wherein the physical uplink control channel region is located in a predetermined portion within the subband.

(Supplementary Note 12)

The base station according to Supplementary Note 11, wherein the predetermined portion is a portion at the edge of the subband.

(Supplementary Note 13)

The base station according to Supplementary Note 11, wherein the predetermined portion is a portion spaced from the edge of the subband with a predetermined gap.

(Supplementary Note 14)

The base station according to any one of Supplementary Notes 5 to 13, wherein the bandwidth part used by the first terminal apparatus includes one or more of subbands included in a bandwidth part used by a second terminal apparatus different from the first terminal apparatus.

(Supplementary Note 15)

The base station according to any one of Supplementary Notes 1 to 14, wherein the communication processing unit is configured to transmit, to the first terminal apparatus, first control information for specifying the physical uplink control channel region.

(Supplementary Note 16)

The base station according to Supplementary Note 15, wherein the uplink system band includes a plurality of subbands, the bandwidth part includes one or more of the plurality of subbands, the physical uplink control channel region is located within a subband included in the bandwidth part, and the first control information is control information for specifying a subband within which the physical uplink control channel region is located.

(Supplementary Note 17)

The base station according to Supplementary Note 16, wherein the bandwidth part includes two or more of the plurality of subbands, the physical uplink control channel region is located within one candidate band out of two or more candidate bands within the bandwidth part, each of the two or more candidate subbands is one subband within the bandwidth part or two or more subbands contiguous in frequency direction within the bandwidth part, the first control information is control information for identifying a candidate band within which the physical uplink control channel region is located, and the communication processing unit is configured to transmit, to the first terminal apparatus, second control information for specifying the two or more candidate bands.

(Supplementary Note 18)

The base station according to Supplementary Note 17, wherein the communication processing unit is configured to transmit, to the first terminal apparatus, a media access control (MAC) control element including the second control information.

(Supplementary Note 19)

The base station according to Supplementary Note 17, wherein the communication processing unit is configured to transmit, to the first terminal apparatus, a radio resource control (RRC) message including the second control information.

(Supplementary Note 20)

The base station according to any one of Supplementary Notes 17 to 19, wherein the first control information is an index for identifying a candidate band from among a plurality of candidate bands within the uplink system band, the candidate band being a candidate band within which the physical uplink control channel region is located.

(Supplementary Note 21)

The base station according to any one of Supplementary Notes 17 to 19, wherein the first control information is an index for identifying a candidate band from among the two or more candidate bands within the bandwidth part, the candidate band being a candidate band within which the physical uplink control channel region is located.

(Supplementary Note 22)

The base station according to Supplementary Note 20 or 21, wherein the communication processing unit is configured to transmit, to the first terminal apparatus, downlink control information (DCI) including the index.

(Supplementary Note 23)

The base station according to Supplementary Note 20 or 21, wherein the communication processing unit is configured to transmit, to the first terminal apparatus, a media access control (MAC) control element including the index.

(Supplementary Note 24)

A first terminal apparatus comprising:

a communication processing unit configured to communicate with a base station in a bandwidth part of an uplink system band, the bandwidth part being used by the first terminal apparatus, wherein the bandwidth part includes a physical uplink control channel region used by the first terminal apparatus.

(Supplementary Note 25)

A method comprising:

communicating with a first terminal apparatus in a bandwidth part of an uplink system band, the bandwidth part being used by the first terminal apparatus, wherein the bandwidth part includes a physical uplink control channel region used by the first terminal apparatus.

(Supplementary Note 26)

A method comprising:

communicating with a base station in a bandwidth part of an uplink system band, the bandwidth part being used by the first terminal apparatus, wherein the bandwidth part includes a physical uplink control channel region used by the first terminal apparatus.

(Supplementary Note 27)

A program that causes a processor to execute:

communicating with a first terminal apparatus in a bandwidth part of an uplink system band, the bandwidth part being used by the first terminal apparatus, wherein the bandwidth part includes a physical uplink control channel region used by the first terminal apparatus.

(Supplementary Note 28)

A program that causes a processor to execute:

communicating with a base station in a bandwidth part of an uplink system band, the bandwidth part being used by the first terminal apparatus, wherein the bandwidth part includes a physical uplink control channel region used by the first terminal apparatus.

(Supplementary Note 29)

A non-transitory computer readable recording medium having recorded thereon a program that causes a processor to execute:

communicating with a first terminal apparatus in a bandwidth part of an uplink system band, the bandwidth part being used by the first terminal apparatus, wherein the bandwidth part includes a physical uplink control channel region used by the first terminal apparatus.

(Supplementary Note 30)

A non-transitory computer readable recording medium having recorded thereon a program that causes a processor to execute:

communicating with a base station in a bandwidth part of an uplink system band, the bandwidth part being used by the first terminal apparatus, wherein the bandwidth part includes a physical uplink control channel region used by the first terminal apparatus.

(Supplementary Note 31)

A system comprising:

a base station including a communication processing unit configured to communicate with a first terminal apparatus in a bandwidth part of an uplink system band, the bandwidth part being used by the first terminal apparatus; and the first terminal apparatus including a communication processing unit configured to communicate with the base station in the bandwidth part, wherein the bandwidth part includes a physical uplink control channel region used by the first terminal apparatus.

This application claims priority based on Japanese Patent Application No. 2017-149247 filed on Aug. 1, 2017, the entire disclosure of which is incorporated

INDUSTRIAL APPLICABILITY

In a mobile communication system, it is possible for a first terminal apparatus to transmit a physical uplink control channel to a base station without retuning regardless of a bandwidth part used by the first terminal apparatus.

REFERENCE SIGNS LIST

1 System
100 Base Station
200 Terminal Apparatus
141, 150, 231, 240 Communication Processing Unit
143 Information Obtaining Unit

What is claimed is:

1. A method performed by a user equipment (UE), the method comprising:
  receiving, from a base station, a radio resource control (RRC) message including first control information identifying a first index, wherein the first index is mapped to a first offset, from among a plurality of possible offsets, in accordance with a table;
  receiving, from the base station, a Physical Downlink Control Channel (PDCCH), which corresponds to one or more control channel element(s) (CCE(s)),
  wherein Downlink Control Information (DCI) is carried in the PDCCH;

determining a second distance, based on a second index of a first CCE of the one or more CCE(s);

determining a first position of a resource block of a Physical Uplink Control Channel (PUCCH) transmission based on the first offset and the second distance; and performing the PUCCH transmission at the first position of the resource block, wherein the PUCCH transmission includes Hybrid Automatic Repeat Request (HARQ)-Acknowledgement (ACK) information corresponding to the DCI, wherein the first position is located within an uplink bandwidth part, wherein the first offset is independent of the second index, wherein the first offset indicates a first distance between a boundary of the uplink bandwidth part and a second position, and wherein the second distance is a distance between the second position and the first position.

2. The method according to claim 1, wherein the first position is located within the uplink bandwidth part in a frequency domain.

3. The method according to claim 1, wherein first position is determined by adding to the boundary of the uplink bandwidth part, the first offset and a value of the second distance.

4. The method according to claim 1, wherein the first offset is in first units of a resource in a frequency domain, the resource in the first units being defined within the uplink bandwidth part in the frequency domain and being numbered from 0 to (a first value −1), and wherein the first value is a size of the uplink bandwidth part.

5. The method according to claim 1, wherein the plurality of possible offsets includes discontinuous integer values.

6. The method according to claim 1, wherein the boundary of the uplink bandwidth part corresponds to a second offset from a boundary of a carrier bandwidth.

7. The method according to claim 1, wherein the uplink bandwidth part is located within a carrier bandwidth.

8. The method according to claim 1, wherein the PUCCH transmission is performed using frequency hopping, and the first position is either a resource block of the PUCCH transmission in a first hop of the frequency hopping or a resource block of the PUCCH transmission in a second hop of the frequency hopping.

9. A method performed by a base station, the method comprising:

transmitting, to a user equipment (UE), a radio resource control (RRC) message including first control information identifying a first index, wherein the first index is mapped to a first offset, from among a plurality of possible offsets, in accordance with a table;

transmitting, to the UE, a Physical Downlink Control Channel (PDCCH), which corresponds to one or more control channel element(s) (CCE(s)), wherein Downlink Control Information (DCI) is carried in the PDCCH; and receiving, from the UE, a Physical Uplink Control Channel (PUCCH) at a first position of a resource block, wherein the PUCCH includes Hybrid Automatic Repeat Request (HARQ)-Acknowledgement (ACK) information corresponding to the DCI, wherein the first position is located within an uplink bandwidth part, wherein the first position corresponds to the first offset and a second distance which is based on a second index of a first CCE of the one or more CCE(s), wherein the first offset is independent of the second index, wherein the first offset indicates a first distance between a boundary of the uplink bandwidth part and a second position, and wherein the second distance is a distance between the second position and the first position.

10. The method according to claim 9, wherein the first position is located within the uplink bandwidth part in a frequency domain.

11. The method according to claim 9, wherein first position is determined by adding to the boundary of the uplink bandwidth part, the first offset and a value of the second distance.

12. The method according to claim 9, wherein the first offset is in first units of a resource in a frequency domain, the resource in the first units being defined within the uplink bandwidth part in the frequency domain and being numbered from 0 to (a first value −1), and wherein the first value is a size of the uplink bandwidth part.

13. The method according to claim 9, wherein the plurality of possible offsets includes discontinuous integer values.

14. The method according to claim 9, wherein the boundary of the uplink bandwidth part corresponds to a second offset from a boundary of a carrier bandwidth.

15. The method according to claim 9, wherein the uplink bandwidth part is located within a carrier bandwidth.

16. The method according to claim 9, wherein the PUCCH is received using frequency hopping, and the first position is either a resource block of the PUCCH in a first hop of the frequency hopping or a resource block of the PUCCH in a second hop of the frequency hopping.

17. A user equipment (UE) comprising:

a processor configured to control:

receiving, from a base station, a radio resource control (RRC) message including first control information identifying a first index, wherein the first index is mapped to a first offset, from among a plurality of possible offsets, in accordance with a table;

receiving, from the base station, a Physical Downlink Control Channel (PDCCH), which corresponds to one or more control channel element(s) (CCE(s)), wherein Downlink Control Information (DCI) is carried in the PDCCH;

determining a second distance, based on a second index of a first CCE of the one or more CCE(s);

determining a first position of a resource block of a Physical Uplink Control Channel (PUCCH) transmission based on the first offset and the second distance; and performing the PUCCH transmission at the first position of the resource block, wherein the PUCCH transmission includes Hybrid Automatic Repeat Request (HARQ)-Acknowledgement (ACK) information corresponding to the DCI, wherein the first position is located within an uplink bandwidth part, wherein the first offset is independent of the second index, wherein the first offset indicates a first distance between a boundary of the uplink bandwidth part and a second position, and wherein the second distance is a distance between the second position and the first position.

18. The UE according to claim 17, wherein the first position is located within the uplink bandwidth part in a frequency domain.

19. The UE according to claim 17, wherein first position is determined by adding to the boundary of the uplink bandwidth part, the first offset and a value of the second distance.

20. The UE according to claim 17, wherein the first offset is in first units of a resource in a frequency domain, the resource in the first units being defined within the uplink bandwidth part in the frequency domain and being numbered from 0 to (a first value −1), and wherein the first value is a size of the uplink bandwidth part.

21. The UE according to claim 17, wherein the plurality of possible offsets includes discontinuous integer values.

22. The UE according to claim 17, wherein the boundary of the uplink bandwidth part corresponds to a second offset from a boundary of a carrier bandwidth.

23. The UE according to claim 17, wherein the uplink bandwidth part is located within a carrier bandwidth.

24. The UE according to claim 17, wherein the PUCCH transmission is performed using frequency hopping, and the first position is either a resource block of the PUCCH transmission in a first hop of the frequency hopping or a resource block of the PUCCH transmission in a second hop of the frequency hopping.

25. A base station comprising:
a processor configured to control:
transmitting, to a user equipment (UE), a radio resource control (RRC) message including first control information identifying a first index, wherein the first index is mapped to a first offset, from among a plurality of possible offsets, in accordance with a table;
transmitting, to the UE, a Physical Downlink Control Channel (PDCCH), which corresponds to one or more control channel element(s) (CCE(s)),
wherein Downlink Control Information (DCI) is carried in the PDCCH; and
receiving, from the UE, a Physical Uplink Control Channel (PUCCH) at a first position of a resource block,
wherein the PUCCH includes Hybrid Automatic Repeat Request (HARQ)-Acknowledgement (ACK) information corresponding to the DCI, wherein the first position is located within an uplink bandwidth part, wherein the first position corresponds to the first offset and a second distance which is based on a second index of a first CCE of the one or more CCE(s), wherein the first offset is independent of the second index, wherein the first offset indicates a first distance between a boundary of the uplink bandwidth part and a second position, and wherein the second distance is a distance between the second position and the first position.

26. The base station according to claim 25, wherein the first position is located within the uplink bandwidth part in a frequency domain.

27. The base station according to claim 25, wherein first position is determined by adding to the boundary of the uplink bandwidth part, the first offset and a value of the second distance.

28. The base station according to claim 25, wherein the first offset is in first units of a resource in a frequency domain, the resource in the first units being defined within the uplink bandwidth part in the frequency domain and being numbered from 0 to (a first value −1), and wherein the first value is a size of the uplink bandwidth part.

29. The base station according to claim 25, wherein the plurality of possible offsets includes discontinuous integer values.

30. The base station according to claim 25, wherein the boundary of the uplink bandwidth part corresponds to a second offset from a boundary of a carrier bandwidth.

* * * * *